US010726718B1

(12) United States Patent
Lyles et al.

(10) Patent No.: US 10,726,718 B1
(45) Date of Patent: Jul. 28, 2020

(54) METHOD FOR MANAGING VEHICLE PARKING WITHIN A PARKING STRUCTURE

(71) Applicant: Auto Park Hawaii, Inc., Honolulu, HI (US)

(72) Inventors: John Lyles, Honolulu, HI (US); Fred Moore, Honolulu, HI (US)

(73) Assignee: Auto Park Hawaii, Inc., Honolulu, HI (US)

( * ) Notice: Subject to any disclaimer, the term of this patent is extended or adjusted under 35 U.S.C. 154(b) by 0 days.

(21) Appl. No.: 16/735,206

(22) Filed: Jan. 6, 2020

Related U.S. Application Data

(60) Provisional application No. 62/788,766, filed on Jan. 4, 2019.

(51) Int. Cl.
*G08G 1/017* (2006.01)
*G06K 9/32* (2006.01)
*G08G 1/01* (2006.01)
*G07B 15/02* (2011.01)
*G06F 16/33* (2019.01)

(52) U.S. Cl.
CPC .......... *G08G 1/0175* (2013.01); *G06F 16/33* (2019.01); *G06K 9/325* (2013.01); *G07B 15/02* (2013.01); *G08G 1/0129* (2013.01); *G06K 2209/15* (2013.01)

(58) Field of Classification Search
CPC .. G06K 2209/15; G06K 9/325; G08G 1/0175; G08G 1/0129; G06F 16/33; G07B 15/02
See application file for complete search history.

(56) References Cited

U.S. PATENT DOCUMENTS

| 2014/0036076 | A1* | 2/2014 | Nerayoff | G06K 9/00791 348/148 |
| 2014/0214500 | A1* | 7/2014 | Hudson | G06Q 30/0284 705/13 |
| 2015/0077548 | A1* | 3/2015 | Meredith | H04N 7/183 348/143 |
| 2015/0248595 | A1* | 9/2015 | Khan | G08G 1/0175 382/105 |
| 2017/0032584 | A1* | 2/2017 | Moran | H04W 4/029 |
| 2018/0247103 | A1* | 8/2018 | Hsu | G06F 3/00 |
| 2018/0268238 | A1* | 9/2018 | Khan | G06F 16/583 |
| 2019/0050634 | A1* | 2/2019 | Nerayoff | G06K 9/00838 |
| 2019/0304307 | A1* | 10/2019 | Huang | G06K 9/00771 |

* cited by examiner

*Primary Examiner* — Shaghayegh Azima
(74) *Attorney, Agent, or Firm* — Run8 Patent Group, LLC; Peter Miller

(57) ABSTRACT

One variation of a method for managing parking within a parking structure includes: after detecting a license plate number on a vehicle in an image captured by an entry camera unit arranged near an entry of the parking structure, labeling the license plate as unverified in a data log associated with the parking structure; in response to absence of validation of the license plate within a grace period after entry of the vehicle, relabeling the license plate as in-violation in the data log; in response to detecting the license plate in an image captured by a mobile enforcement unit moving through the parking structure, querying the data log for a status of the license plate; and, in response to the license plate labeled as in-violation in the data log, serving a prompt to an enforcement personnel to issue a citation to a vehicle carrying the license plate.

20 Claims, 5 Drawing Sheets

METHOD FOR MANAGING VEHICLE PARKING WITHIN A PARKING STRUCTURE

CROSS-REFERENCE TO RELATED APPLICATIONS

This Application claims the benefit of U. S. Provisional Application No. 62/788,766, filed on 4 Jan. 2019, which is incorporated in its entirety by this reference.

TECHNICAL FIELD

This invention relates generally to the field of vehicle parking systems and more specifically to a new and useful method for managing vehicle parking within a parking structure in the field of vehicle parking systems.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
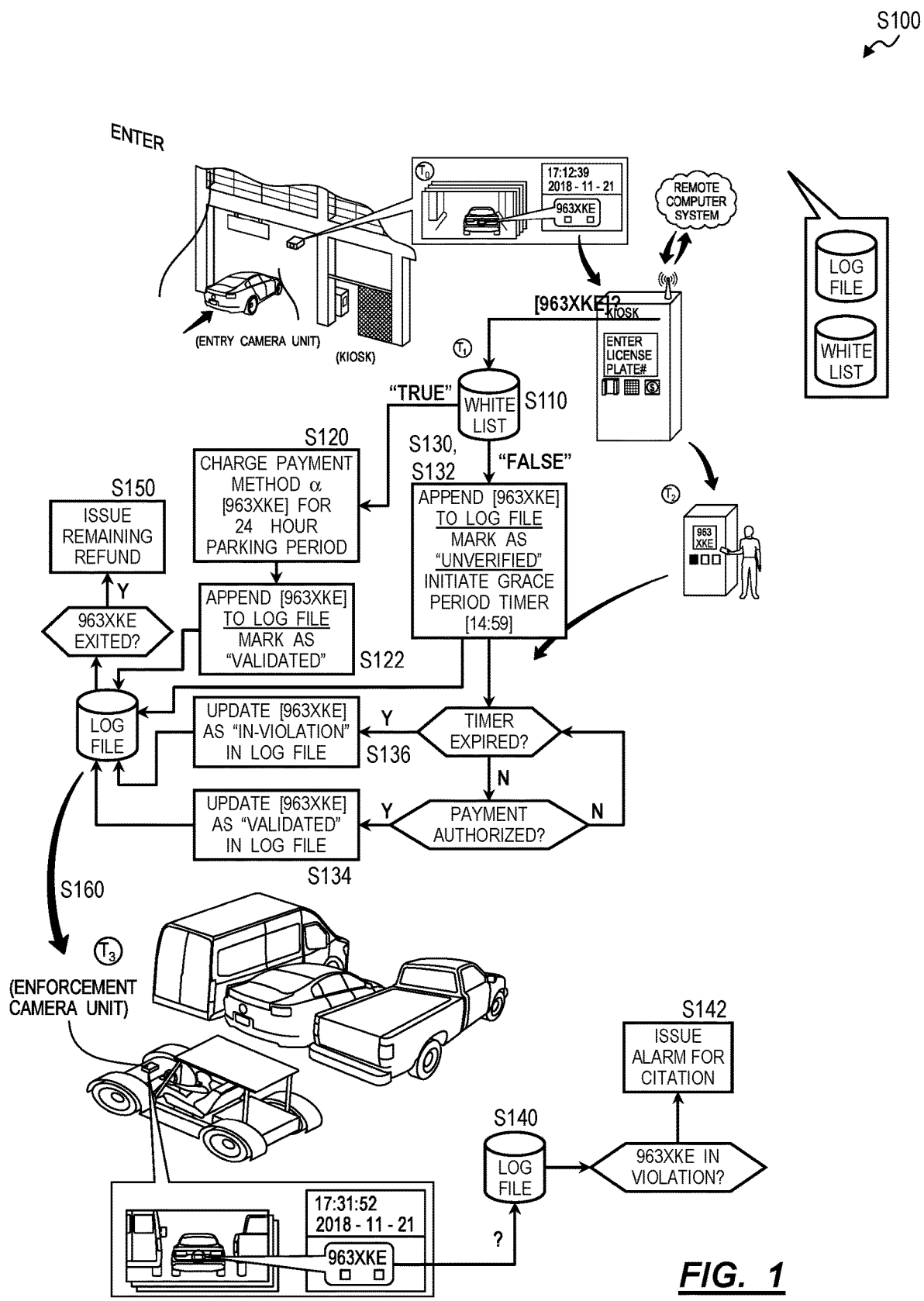
FIG. 1 is a flowchart representation of a method.

As shown in FIG. 1, a method S100 for managing vehicle parking within a parking structure includes: in response to detecting a license plate number in a first image captured by an entry camera unit arranged near an entrance of the parking structure, querying a whitelist for the license plate number in Block Silo; and, in response to the whitelist containing the license plate number, billing a stored payment method associated with the license plate number for parking in the parking structure in Block S120 and appending a data log for the parking structure with the license plate number marked as validated (or "paid," "verified") in Block S122. The method S100 also includes, in response to the whitelist excluding the license plate number: appending the data log for the parking structure with the license plate number marked as unverified in Block S130; initiating a timer, associated with the license plate number, for a duration of a grace period in Block S132; in response to selection of the license plate number and submission of a new payment method at a kiosk in the parking structure, updating the license plate number as validated in the data log in Block S134; and, in response to expiration of the timer prior to authorization of the license plate number, updating the license plate number as in-violation in the data log in Block S136. The method S100 further includes: in response to detecting the license plate number in a second image captured by a mobile enforcement unit associated with the enforcement personnel moving through the parking structure, querying the data log for a status of the license plate number in Block S140; in response to the data log returning an in-violation status of the license plate number, serving a prompt to the enforcement personnel to issue a citation to a vehicle carrying the license plate number in Block S142; and, in response to detecting the license plate number in a third image captured by an exit camera unit arranged near an exit of the parking structure, clearing the license plate number from the data log in Block S150.

One variation of the method S100 shown in FIGS. 2A-2D includes, in response to detecting a first license plate number in a first image captured by an entry camera unit arranged near an entrance of the parking structure, querying a whitelist for the first license plate number in Block S110. This variation of the method S100 also includes, in response to the whitelist excluding the first license plate number: labeling the first license plate number as unverified in a data log associated with the parking structure in Block S130; initiating a timer, associated with the first license plate number, for a duration of a grace period in Block S132; and, in response to expiration of the timer prior to validation of the first license plate number, relabeling the first license plate number as in-violation in the data log in Block S136. This variation of the method S100 further includes: in response to detecting the first license plate number in a second image captured by a mobile enforcement unit moving through the parking structure, querying the data log for a status of the first license plate number in Block S140; in response to the first license plate number labeled as in-violation in the data log, serving a prompt to an enforcement personnel associated with the mobile enforcement unit to issue a citation to a first vehicle carrying the first license plate number in Block S142; and, in response to detecting the first license plate number in a third image captured by an exit camera unit arranged near an exit of the parking structure, labeling the first license plate number as exited in the data log in Block S150.

Another variation of the method S100 shown in FIGS. 2A-2D includes, in response to detecting a license plate number in a first image, captured by an entry camera unit arranged near an entrance of the parking structure at a first time, querying a whitelist for the first license plate number in Block Silo. This variation of the method S100 also includes, in response to the whitelist excluding the first license plate number: appending the data log for the parking structure with the first license plate number labeled as unverified in Block S130; and, in response to absence of submission of a new payment method, in association with the first license plate number, at a physical kiosk in the parking structure prior to a second time succeeding the first time by a grace period duration, relabeling the first license plate number as in-violation in the data log in Block S136. This variation of the method S100 further includes, in response to detecting the first license plate number in a second image captured by a mobile enforcement unit moving through the parking structure and associated with an the enforcement personnel: querying the data log for a status of the first license plate number in Block S140; and, in response to the first license plate number labeled as in-violation in the data log, serving a prompt to the enforcement personnel to issue a citation to a vehicle carrying the first license plate number in Block S142. Furthermore, this variation of the method S100 includes, in response to detecting the first license plate number in a third image captured by an exit camera unit arranged near an exit of the parking structure at a third time, labeling the first license plate number as exited in the data log in Block S150.

Figure 2A:
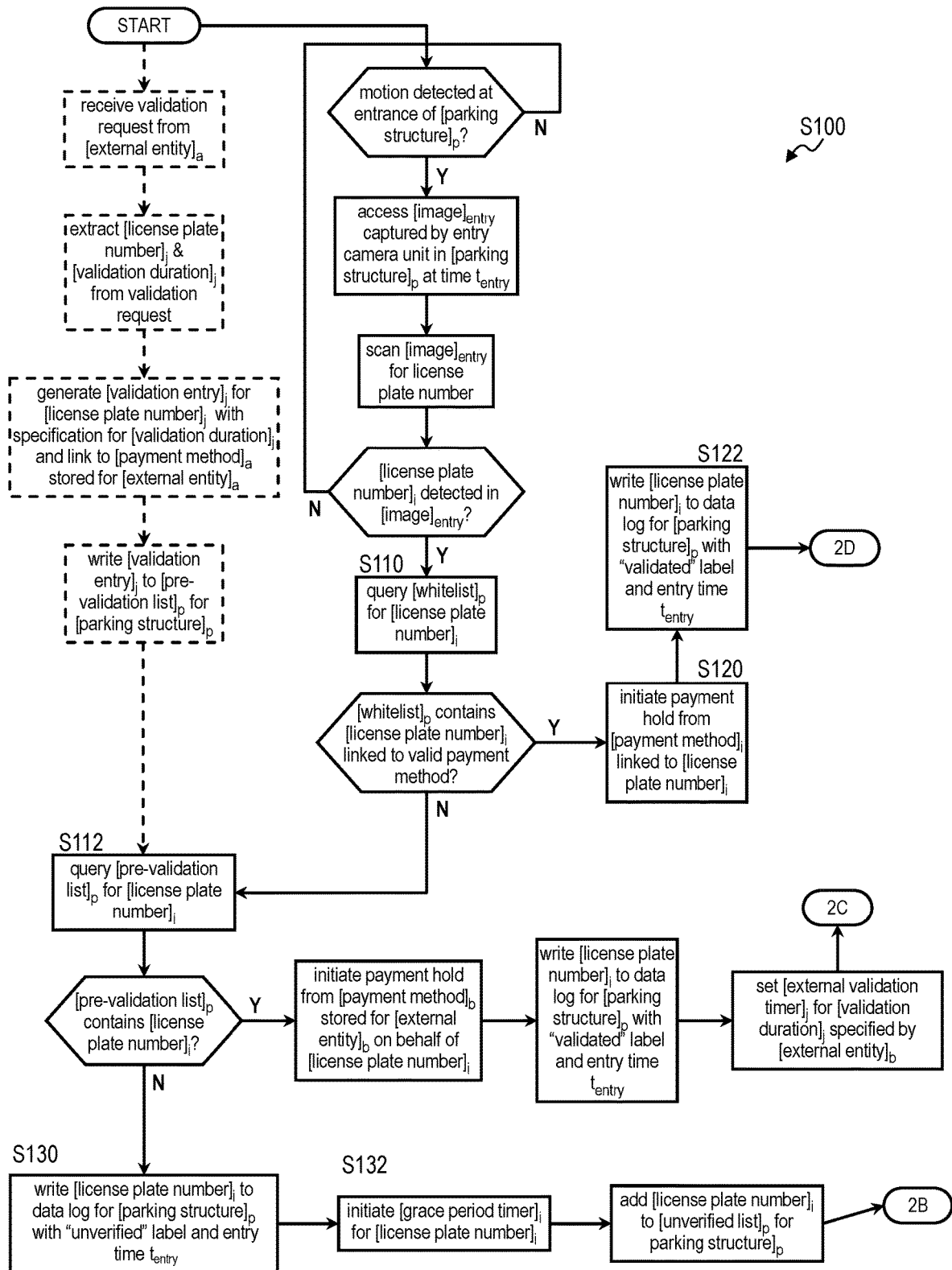
FIGS. 2A-2D are flowchart representations of one variation of the method.
Figure 3:
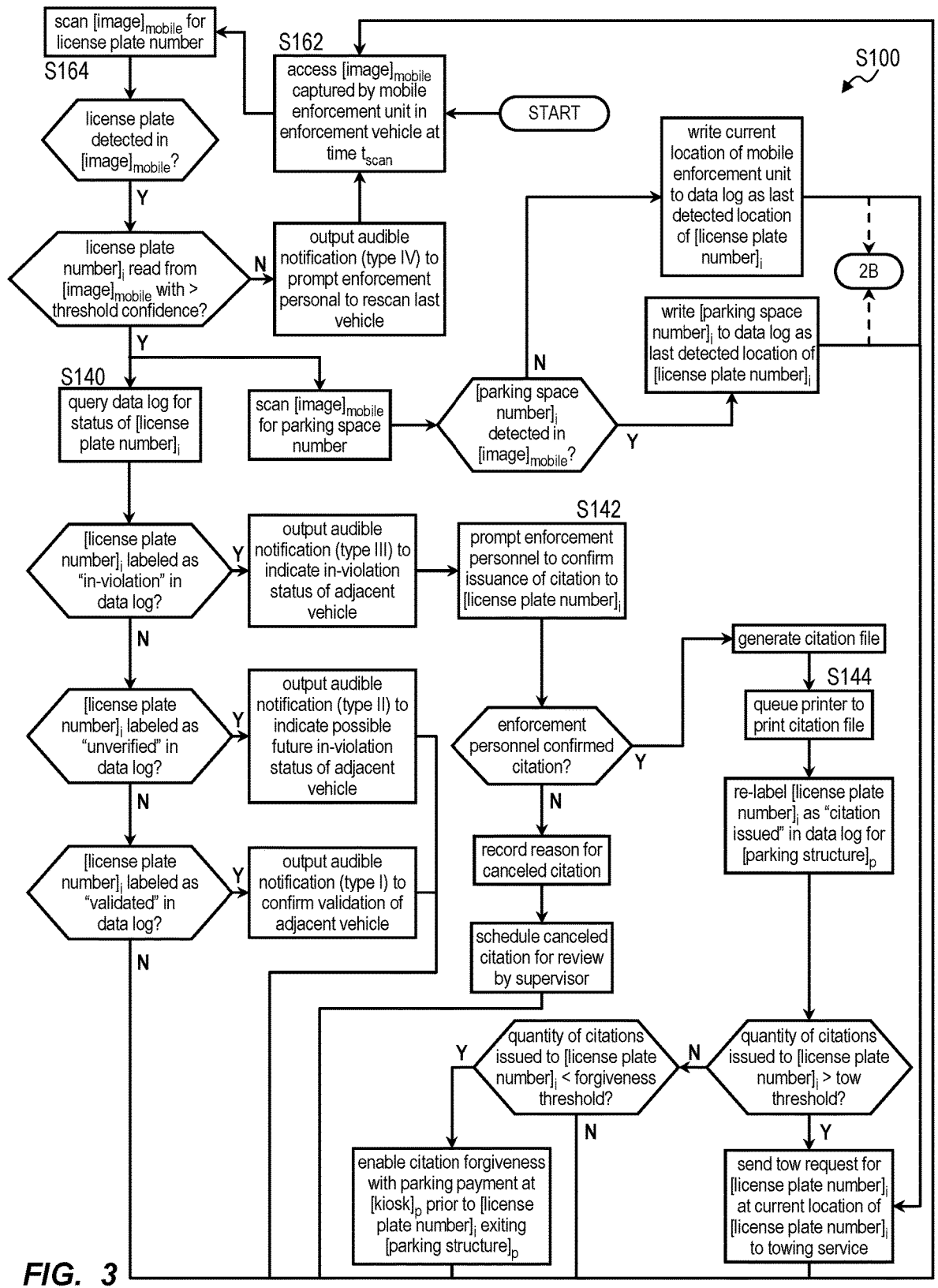
FIG. 3 is a flowchart representation of one variation of the method.

Yet another variation of the method S100 shown in FIGS. 2A and 3 includes: deploying a mobile enforcement unit to the parking structure in Block S160; accessing an image feed captured by a mobile camera arranged on the mobile enforcement unit while the mobile enforcement unit moves past vehicles occupying parking spaces in the parking structure in Block S162; and scanning images, in the image feed, for license plate numbers in Block S164. This variation of the method S100 also includes, for each license plate number detected in the image feed: querying a data log associated with the parking structure for a status of the license plate number in Block S140; and, in response to the license plate number labeled as in-violation in the data log, outputting a first notification—representing absence of parking validation for the license plate number within a grace period duration following entry of the vehicle into the parking structure—to an enforcement personnel occupying the mobile enforcement unit as the mobile enforcement unit moves past a vehicle carrying the license plate number in Block S142; and queuing a printer to print a paper parking citation designating the license plate number in Block S144.

2. Applications

Generally, the method S100 can be executed by a system—including: an entry camera unit arranged near an entry of a parking structure, an exit camera arranged near an exit of the parking structure, a kiosk located in or near the parking structure, and a mobile enforcement unit—to automatically manage parking authorization and parking fees within the parking structure and to support the enforcement personnel operating in the parking structure based on license plate numbers detected in images captured by these entry, exit, and mobile enforcement units. For example, the system can be installed in a multi-level parking garage, a parking lot, or other parking structure to monitor license plate numbers of vehicles entering and exiting the parking structure, to collect and manage payment methods provided by owners or operators of these vehicles, and to interface with the enforcement personnel to issue citations to unverified vehicles occupying the parking structure for durations exceeding a grace period.

In particular, Blocks of the method S100 can be executed locally on entry and/or exit camera units arranged in the parking structure, a kiosk arranged in or near the parking structure, a local computer system arranged in the parking structure, and/or a remote computer system (e.g., a computer network, a remote server): to capture images of entry and exit lanes in the parking structure; to read license plate numbers of vehicles entering and exiting the parking structure; and to monitor validation (e.g., payment) status of vehicles carrying these license plate numbers. In one implementation, upon reading a license plate number of a vehicle entering the parking structure—in an image captured by the entry camera unit—the kiosk (or the local or remote computer system) can: query a whitelist of license plate numbers linked to stored payment methods; and query a pre-validation list of license plate numbers preemptively validated by local businesses or other local entities. Upon identifying the license plate number in the whitelist, the kiosk can initiate payment (or a "payment hold") for a maximum daily parking rate in the parking structure from a stored payment method linked to the license plate number; upon identifying the license plate number (or a very similar license plate number) in the pre-validation list, the kiosk can initiate payment—from a corresponding entity—for the maximum daily parking rate or for a maximum rate previously specified by the corresponding entity. Upon confirmation of the payment hold, the kiosk can write the license plate number to a data log with the vehicle's time of entry (e.g., a timestamp of an image captured by the entry camera unit and depicting the license plate number) and a "validated" label.

However, if the kiosk (or the local or remote computer system) fails to find the license plate number in the whitelist or pre-validation list, the kiosk can: write the license plate number to the data log with its time of entry and an "unverified" label; and initiate a timer for a grace period duration (e.g., fifteen minutes) sufficient for the vehicle's operator to park the vehicle in a parking space in the parking structure, exit the vehicle, find a kiosk, and remit payment for parking in the parking structure. During this grace period, the kiosk can present this license plate number on its integrated display, such as along with other unverified license plate numbers of other vehicles that recently entered the parking structure. Upon selection of this license plate number and submission of a payment method (e.g., a credit card) at the kiosk, the kiosk (or the local or remote computer system) can: initiate payment for the maximum daily parking rate from the supplied payment method; and update the data log to reflect validation of the license plate number.

In the foregoing scenarios, when the kiosk (or exit camera unit, local computer system, or remote computer system) detects the license plate number in an exit image captured by the exit camera unit, the kiosk can: calculate a total duration of time from entry of the vehicle into the parking structure to exit of the vehicle from the parking structure (such as less the grace period duration); calculate a parking fee for this total duration; and then initiate a partial refund—to the payment method supplied for the license plate number—for the difference between the maximum daily rate and the parking fee if the maximum daily rate exceeds the parking fee.

However, if the grace period timer for this license plate number expires prior to submission of a valid payment method linked to this license plate number, the kiosk (or the local or remote computer system) can update the data log to reflect that the license plate number is now in violation of parking and payment rules of the parking structure.

The kiosk (or the local or remote computer system) can execute the foregoing process for each vehicle entering and exiting the parking structure.

Concurrently, an enforcement personnel may navigate an enforcement vehicle—such as a low-speed vehicle or a golf cart outfitted with a mobile enforcement unit—throughout the parking structure. The mobile enforcement unit can include a camera facing outwardly from a side of the enforcement vehicle such that license plate numbers arranged on vehicles parked in parking spaces in the parking structure fall within the field of view of this camera as the enforcement personnel drives the enforcement vehicle through the parking structure. In particular, the mobile enforcement unit can: capture images as the enforcement personnel drives the enforcement vehicle through the parking structure; implement methods and techniques similar to the entry and exit camera units to detect and read license plate numbers from these images in near real-time; and can query the data log for a status of each license plate number read from these images. In response to the data log returning an "in-violation" status of a license plate number thus read from an image captured by the mobile enforcement unit, the mobile enforcement unit can output a notification to the enforcement personnel, such as in the form of: an audible prompt; and/or a prompt—rendered on a display coupled to the mobile enforcement unit—identifying the license plate number and including a prompt to issue a citation to a nearby vehicle carrying this license plate number. Upon receipt of confirmation from the enforcement personnel to issue a citation to this vehicle, the mobile enforcement unit can automatically generate a digital copy of a citation for this vehicle—such as including the license plate number, the entry time of the vehicle retrieved from the data log, an identifier of the parking structure, and the current time—and then queue a printer coupled to the mobile enforcement unit to print this citation. The enforcement personnel may then place this printed citation on the corresponding vehicle.

Therefore, Blocks of the method S100 can be executed by and/or in cooperation with a kiosk, entry and exit camera units, and a mobile enforcement unit to monitor payment statuses of vehicles occupying the parking structure and to enforce parking rules in the parking structure without necessitating installation of gates, underground vehicle sensors, or other substantive infrastructure. The system can therefore be rapidly deployed to a parking structure with limited infrastructure changes or investment. Furthermore, by averting gates, underground vehicle sensors, or other substantive infrastructure, the system can consistently and reliably execute the method S100 over time with limited maintenance or management of physical systems (e.g., repair of gates, replacement of battery-powered vehicle sensors).

By automatically detecting license plate numbers entering the parking structure, monitoring statuses of these license plate numbers based on payment rules assigned to the parking structure, and automatically detecting license plate numbers in images captured by the mobile enforcement unit as the enforcement personnel navigates the enforcement vehicle and mobile enforcement unit throughout the parking structure, the system—executing Blocks of the method S100—can retrieve statuses of vehicles in the immediate vicinity of the enforcement personnel in (near) real-time and selectively prompt the enforcement personnel to stop the enforcement vehicle and issue citations to in-violation vehicles only, thereby enabling the enforcement personnel to rapidly scan vehicles in the parking structure with minimal downtime. Furthermore, by automatically generating citations for in-violation vehicles based on their entry times and license plate numbers and interfacing with a printer to automatically print citations for in-violation vehicles according to the method S100, the system can enable the enforcement personnel to quickly retrieve and place a citation on an in-violation vehicle within minimal manual input before returning to navigating the enforcement vehicle through the parking structure. For example, the system can execute Blocks of the method S100 to enable the enforcement personnel to scan up to 4,000 vehicles per hour while navigating the enforcement vehicle at a speed of 10 miles per hour within a parking structure with rows of ten-foot-wide parking spaces. In another example, the system can execute Blocks of the method S100 to enable the enforcement personnel to scan every parking space in a 400-stall parking structure and place citations on four in-violation vehicles in the parking structure within ten minutes.

Furthermore, because the method S100 enables such time-efficient and personnel-efficient monitoring of vehicles entering a parking structure, the system can be deployed to a cluster of parking structures and the system can interface with a single mobile enforcement unit mounted on a single enforcement vehicle operated by a single enforcement personnel to monitor vehicles in the parking structures. For example, the system can be deployed to a cluster of four parking structures located on one city block and containing a total of 2,000 parking spaces; and the enforcement personnel—operating the single enforcement vehicle with the single mobile enforcement unit at a speed of ten miles per hour within these parking structures and at a speed of twenty miles per hour between parking structures—can scan every parking structure in each of these parking structures and issue citations to all in-violation vehicles at least once per hour.

Therefore, the Blocks of the method S100 can be executed by the system to achieve efficient and simple management of a large number of parking spaces such as across multiple parking structures—by a small number of (e.g., a single) enforcement personnel.

3. System

As described above and shown in FIG. 1, the method S100 can be executed by a system including: an entry camera unit arranged near an entry of a parking structure; an exit camera arranged near an exit of the parking structure; a kiosk located in or near the parking structure; and a mobile enforcement unit.

3.1 Camera Units

In particular, the system can include a forward-facing entry camera unit configured for arrangement near a vehicle entrance of the parking structure such an entry lane of the parking structure falls within a field of view of an entry camera (e.g., a black-and-white, grayscale, or color camera) arranged in the forward-facing entry camera unit. Fronts of vehicles entering the parking structure—and front-mounted license plates arranged on these vehicles—may therefore fall into the field of view of the entry camera. The forward-facing entry camera unit can also include a motion sensor defining a field of view that intersects the field of view of the entry camera. As described below, the forward-facing entry camera unit can thus capture images when the motion sensor detects motion in its field of view. Alternatively, the entry camera in the forward-facing entry camera unit can capture images continuously while in operation.

The system can similarly include a forward-facing exit camera unit configured for arrangement near a vehicle exit of the parking structure such that an exit lane of the parking structure falls within a field of view of an exit camera arranged in the forward-facing exit camera unit. Fronts of vehicles exiting the parking structure—and front-mounted license plates arranged on these vehicles—may therefore fall into the field of view of the exit camera. Like the forward-facing entry camera unit, the forward-facing exit camera unit can also include a motion sensor defining a field of view that intersects the field of view of the exit camera.

In one variation, the system additionally or alternatively includes a rear-facing entry camera unit configured for arrangement near a vehicle entrance of the parking structure such that an entry lane of the parking structure falls within a field of view of an entry camera arranged in the rear-facing entry camera unit. Rears of vehicles entering the parking structure—and rear-mounted license plates arranged on these vehicles—may therefore fall in the field of view of this entry camera. In this variation, a forward-facing entry camera unit and a rear-facing entry camera unit can be paired and face opposing directions near a vehicle entrance of the parking structure and can cooperate to capture images of both the front and rear license plates of each vehicle entering the parking structure, thereby increasing a quantity of data available to the system to identify each vehicle entering the parking structure and thus increasing probability that the system will accurately read at least one license plate on each vehicle entering the parking structure.

Similarly, the system can additionally or alternatively include a rear-facing exit camera unit configured for arrangement near a vehicle exit of the parking structure such that an exit lane of the parking structure falls within a field of view of an exit camera arranged in the rear-facing exit camera unit. Rears of vehicles exiting the parking structure—and rear-mounted license plates arranged on these vehicles—may therefore fall into the field of view of this exit camera. In this variation, a forward-facing exit camera unit and a rear-facing exit camera unit can be paired and face opposing directions near a vehicle exit of the parking structure and can cooperate to capture images of both the front and rear license plates of each vehicle exiting the parking structure, thereby increasing a quantity of data available to the system to identify each vehicle exiting the parking structure and thus increasing probability that the system will accurately read at least one license plate on each vehicle exiting the parking structure.

Furthermore, for a parking structure containing multiple entries and/or multiple exits, the system can include: one entry camera unit (or forward-facing and rear-facing entry camera unit pair) per entry; and one forward-facing exit camera unit (or forward-facing and rear-facing exit camera unit pair) per exit.

3.2 Kiosk

The system also includes a kiosk configured to installation within the parking structure, such as: near a pedestrian exit on a first level of a multi-level parking garage; near pedestrian exits and stairwells on each level of a multi-level parking garage; or near a pedestrian exit in a parking lot.

The kiosk can include: a payment reader; a user interface, such as including a display, touchscreen, and/or keypad; a communication module; and a processor. The payment reader can include a credit card reader configured to collect payment information from a credit card or debit card and/or a wireless payment reader configured to read payment information from a mobile device supplied by a user. The communication module: can support communications with a remote computer system (e.g., a remote server, a payment processor) over a cellular network or wired local area network; can support wired or wireless communications with entry and exit camera units installed in the parking structure to receive images captured by these camera units and/or license plate numbers detected by the camera units; and can support wireless communications with an enforcement unit, such as including license plate number statuses and issuance of citations. The processor is configured to detect and extract license plate numbers of vehicles entering and exiting the parking structure from images received from entry and exit camera units via the communication module, as described below.

Alternatively, the entry camera unit can include an integrated processor configured to detect and extract license plate numbers from images captured by a camera in the entry camera unit in (near) real-time; and a communication module can transmit this license plate number back to the kiosk for further handling. The exit camera unit: can similarly include a processor configured to locally process images captured by a camera in the exit camera unit; and can similarly return license plate numbers extracted from these images to the kiosk in (near) real-time.

Yet alternatively, the entry and exit camera unit can return images to the kiosk in (near) real-time, the kiosk can transmit these images (e.g., via a wired or wireless connection) to an external computer system, and the external computer system (e.g., a remote server, a local computer arrange in the parking structure) can detect and extract license plate numbers—of vehicles entering and exiting the parking structure—from these images.

4. Vehicle Detection

Therefore, a processor in each entry and exit camera unit, a processor in the kiosk, or a external computer system can process images captured by these entry and exit camera units to track vehicles entering and exiting the parking structure.

4.1 Plate Detection with Motion Sensing

In one implementation, the entry camera unit defaults to operating in an inactive state. When the motion sensor in the entry camera unit detects motion in its field of view—and therefore in the field of view of the camera—the entry camera unit enters an active state. In the active state, the camera records a sequence of timestamped images (e.g., black-and-white, grayscale, or RGB color images), such as at a rate of 2 Hz. When the motion sensor no longer detects motion in its field of view, the entry camera unit returns to the inactive state. The entry camera unit serves these timestamped images to the kiosk over a wired or wireless connection, such as in real-time as these images are captured or en masse prior to returning to the inactive state.

The processor—in the kiosk—then locally scans this set of timestamped images received from the entry camera unit for a license plate number of a vehicle. In one example, the processor: implements computer vision techniques—such as edge detection, object detection, and/or optical character recognition, etc.—to scan each image in this sequence for a license plate number; and calculates a confidence score for a license plate number detected in each of these images, such as based on a frequency that the same license plate number is detected in other images in this set, blurriness of the image, etc. The processor can then: store a license plate number—read from this set of images—associated with a highest confidence score in the set in order to uniquely identify this vehicle; and pair this license plate number with an entry time, such as a time (and date) that a first image—depicting this license plate number—in the set of images was captured by the entry camera unit.

4.2 Voting

In another implementation, the entry camera unit streams images to the remote computer system, such as at a rate of 10 Hz. Upon receipt of a next image from the entry camera unit, the remote computer system compares this next image to a preceding image (or to a baseline image) and saves this next image to an image folder in a database in response to the difference between this next image and the preceding (or baseline) image exceeding a threshold difference. Then, when time since a last image was saved to this folder exceeds a threshold duration (e.g., two seconds, which may correspond a time for a vehicle entering the parking structure to pass the entry camera unit), the, the remote computer system can initiate a processing cycle to extract a license plate number from images in this folder.

During this processing cycle, the remote computer system can implement optical character recognition and/or other computer vision techniques to interpret a set of (e.g., four) most-likely license plate numbers and to rank these license plate numbers in order of confidence for each image in this folder. For example, the remote computer system can extract a total of 200 license plate number predictions over 50 images captured by the entry camera unit over a period of five seconds as a vehicle enters the parking structure, with each license plate number in this set ranked "1" (i.e., for lowest confidence in the set), "2," "3," or "4" (i.e., for highest confidence in the set). The remote computer system then sums the rank values within each unique group of identical license plate numbers in this set and store each of these sums as a score for its corresponding license plate number. The remote computer system can also compare each of these unique license plate numbers to license plate numbers previously detected in this parking structure and increases the score for each unique license plate number matched to a license plate number previously detected in this parking structure.

The remote computer system can then: store the license plate number—from this set of license plate numbers read from this set of images in the image folder—associated with the highest score; pair this license plate number with an entry time, such as a time (and date) of a first image—in the folder—in which this license plate number was detected; and then discard this image folder.

4.3 Representative Image

The processor can also select and store a representative image of this vehicle. For example, the processor can identify a least-blurry image—in the set of images—in which the license plate number is detected in the bottom half of the image and store this image as a representative image of the vehicle uniquely identified by this license plate number.

4.4 Multiple Vehicles

Furthermore, if two or more vehicles entered the parking structure over a period of time that this set of images was captured, the processor can implement similar methods and techniques to: detect multiple unique license plate numbers in this set of images; isolate contiguous sequences of images depicting the same (or similar) license plate numbers; store a license plate number associated with a highest confidence score for each contiguous sequence of images that depict the same or similar license plate numbers; and associate each of these license plate numbers with an entry time based on timestamps of images—in this set of images—depicting these license plate numbers. The processor can therefore: detect, identify, and distinguish a sequence of vehicles that entered the parking structure near the entry camera unit in this set of images; store each of these license plate numbers with an entry time (and entry date) that the corresponding vehicle thus entered the parking structure; and select and store a representative image of each of these vehicles.

4.5 Local v. Remote Processing

Alternatively, upon receipt of this set of images from the entry camera unit, the kiosk can transmit this set of images to the external computer system, or the entry camera unit can transmit this set of images directly to the external computer system. The external computer system can implement similar methods and techniques to detect and extract a license plate number and entry time of a vehicle from these images.

Yet alternatively, the entry camera unit can: locally process this set of images to identify a license plate number of a vehicle and entry time of a vehicle; select a representative image of the vehicle from this set of images; and return this license plate number and entry time to the kiosk, such as over a wired or wireless connection.

4.6 Multiple Cameras

In the variation described above in which the system includes both a forward-facing entry camera unit and a rear-facing entry camera unit facing the same entry in the parking structure, the kiosk (or the remote computer system) can verify a license plate number of a vehicle entering the parking structure based on alignment between license plate numbers detected in a first set of images captured by the forward-facing entry camera unit and detected in a second set of images captured by the rear-facing entry camera unit soon after the first set of images.

The system can execute the foregoing methods and techniques for each entry camera unit installed in the parking structure in order to detect and store license plate numbers, entry times, and representative images of vehicles entering the parking structure. The system can implement similar methods and techniques for each exit camera unit installed in the parking structure in order to detect license plate numbers and exit times of vehicles exiting the parking structure.

However, the system can implement any other method or technique to: detect a license plate number of a vehicle entering the parking structure; store an entry time of the vehicle identified by this license plate number; detect the license plate number of the vehicle later exiting the parking structure; and store an exit time of the vehicle identified by this license plate number. Furthermore, license plate number detection in images captured by an entry or exit camera unit can be executed in any other way locally on the camera unit, locally at the kiosk, and/or remotely by the external computer system, such as to accommodate wireless network bandwidth limitations and/or local processing limitations.

5. Data Log

In the foregoing implementations, the system can store a license plate number and entry time of a vehicle thus detected in a set of images captured by an entry camera unit in a data log (or table, database, or other file). For example, the kiosk—installed in the parking structure—can store a local copy of the data log in local memory. Additionally or alternatively, the remote computer system can store a remote copy of the data log, such as a remote master copy of the data log.

6. Whitelist and Validated Vehicle

Block Silo of the method S100 recites, in response to detecting a license plate number in an image captured by the entry camera unit, querying the whitelist for the license plate number. Blocks S120 and S122 of the method S100 recite, in response to the whitelist containing the license plate number: initiating payment for parking in the parking structure via a stored payment method associated with the second license plate number; and labeling the second license plate number as validated in the data log, respectively.

Generally, once the system identifies a license plate number and entry time of a vehicle that recently entered the parking structure, the system can query a whitelist—associated with the parking structure—with the license plate number in order verify whether the license plate number corresponds to a current parking permit for the parking structure or is associated with stored payment information, as shown in FIGS. 1 and 2.

In one implementation, after detecting entry of a new vehicle in a set of images recently captured by an entry camera unit installed in the parking structure, the system (e.g., the kiosk or the remote computer system) queries a "whitelist" of license plate numbers of vehicles—for which parking passes are current and for which a payment method was previously supplied—for the license plate number of this new vehicle. If the whitelist returns confirmation that the license plate number is associated with a current parking pass for which payment was previously supplied (e.g., a monthly parking pass specifying unlimited parking in the parking structure for a one-time upfront fee that was already paid for by the owner of the vehicle associated with the license plate number), the system can label (or "tag") the license plate number as validated in the data log.

Similarly, if the whitelist returns confirmation that the license plate number is associated with a current parking pass for which a payment method (e.g., a credit card, a deposit account) was previously supplied but that is billed ad hoc when the vehicle's license plate number is detected in the parking structure, the system can: initiate payment—via the supplied payment method—for a maximum daily parking fee for parking in the parking structure; and then tag the license plate number as validated in the data log when payment with the supplied payment method is confirmed.

Similarly, if the whitelist returns confirmation that the license plate number is associated with a payment method that was previously supplied—such as when the vehicle was previously parked in the same parking structure or in a related parking structure though the license plate number is not necessarily affiliated with a parking pass for the parking structure—the system can: initiate payment via the payment method associated with the license plate number for a maximum daily parking fee for parking in the parking structure; and then tag the license plate number as validated in the data log when payment with the supplied payment method is confirmed.

6.1 Whitelist Setup

In one implementation, to add a license plate number of a vehicle to the whitelist, a user may submit an application form in paper, via email, or online (e.g., within a web browser or native application). For example, the user may: supply a license plate number; supply a payment method (e.g., credit card information, debit card information, or bank transfer information for a parking deposit account); specify a particular parking structure, parking structure complex, parking structure network, or location (e.g., an office park, a city block); start and end dates; and/or contact information (e.g., an email address, a phone number) in the application. The system (e.g., the remote computer system) or a representative of this system can then create a user account that links the supplied license plate number and payment method to one or more parking structures outfitted with a kiosk, entry camera unit, and exit camera unit. Later, the system can automatically bill the supplied payment method when this license plate number is detected in an image captured by an entry camera unit in one of these parking structures, as described above.

Therefore, the system can link a license plate number on a vehicle to a payment method (e.g., credit card information) supplied by the vehicle's owner or operator. The system can also link owner or operator contact information to the license plate number of the vehicle and can automatically return a parking receipt (e.g., via email) to the vehicle's owner or operator—for actual time spent in a parking structure—when the vehicle's license plate number is detected in the parking structure, thereby: simplifying a physical kiosk in the parking structure (e.g., by eliminating a paper receipt printer); and reducing need of the owner or operator to visit the kiosk upon entry into or exit from the parking structure, which may enable fewer kiosks to serve more parking spaces in a parking structure.

7. Grace Period and Unverified Vehicle

Blocks S130 and S132 recite, in response to the whitelist excluding the license plate number: labeling the license plate number as unverified in the data log associated with the parking structure in Block S130; and initiating a timer, associated with the license plate number, for the duration of the grace period, respectively.

Generally, if the whitelist returns lack of association between the license plate number and a current parking pass or stored payment method, the system can: mark the license plate number as "in grace period" in the data log; and initiate a timer linked to this license plate number for a grace period, as shown in FIG. 2A. For example, the system can implement a fixed grace period duration of fifteen minutes, which may be sufficient time for a vehicle operator to enter the parking structure, find a parking space, park her vehicle, walk to a kiosk, select her license plate number, and enter payment for parking in the parking structure. Alternatively, the system can dynamically adjust the grace period duration, such as inversely proportional to a total quantity of unoccupied spaces remaining in the parking structure (e.g., as calculated based on a total quantity of parking spaces in the facility, less a total quantity of vehicles that have entered the parking structure, plus a total quantity of vehicles that have exited the parking structure). The system can also implement different grace period durations in different parking structures, such as based on (e.g., proportional to) a maximum distance from a parking space to a nearest kiosk in a parking structure.

In one variation, if the whitelist returns confirmation that the license plate number is associated with user contact information (e.g., an email address, a phone number) and a supplied payment method but the payment method is rejected after one or more billing attempts by the system, the system can serve a prompt to update payment information via the supplied contact information, such as in the form of an email, a SMS text message, or a robo-call. If the payment method linked to the license plate number did not previously fail (e.g., if the payment method only recently expired), the system can also mark the license plate number as "in grace period" in the data log for the remainder of the current day, thereby granting a user affiliated with the vehicle an opportunity to supply updated payment information when convenient, such as through the kiosk, a web portal, or a native application, as described below. However, if the payment method linked to the license plate number did fail on a previous day in which the vehicle entered the parking structure and if a user affiliated with the vehicle failed to supply updated payment information before reentering the parking structure on the current day, the system can: mark the license plate number as "in grace period" in the data log; and initiate a timer linked to this license plate number for the grace period (e.g., fifteen minutes).

7.1 Grace Period Payment

Figure 2B:
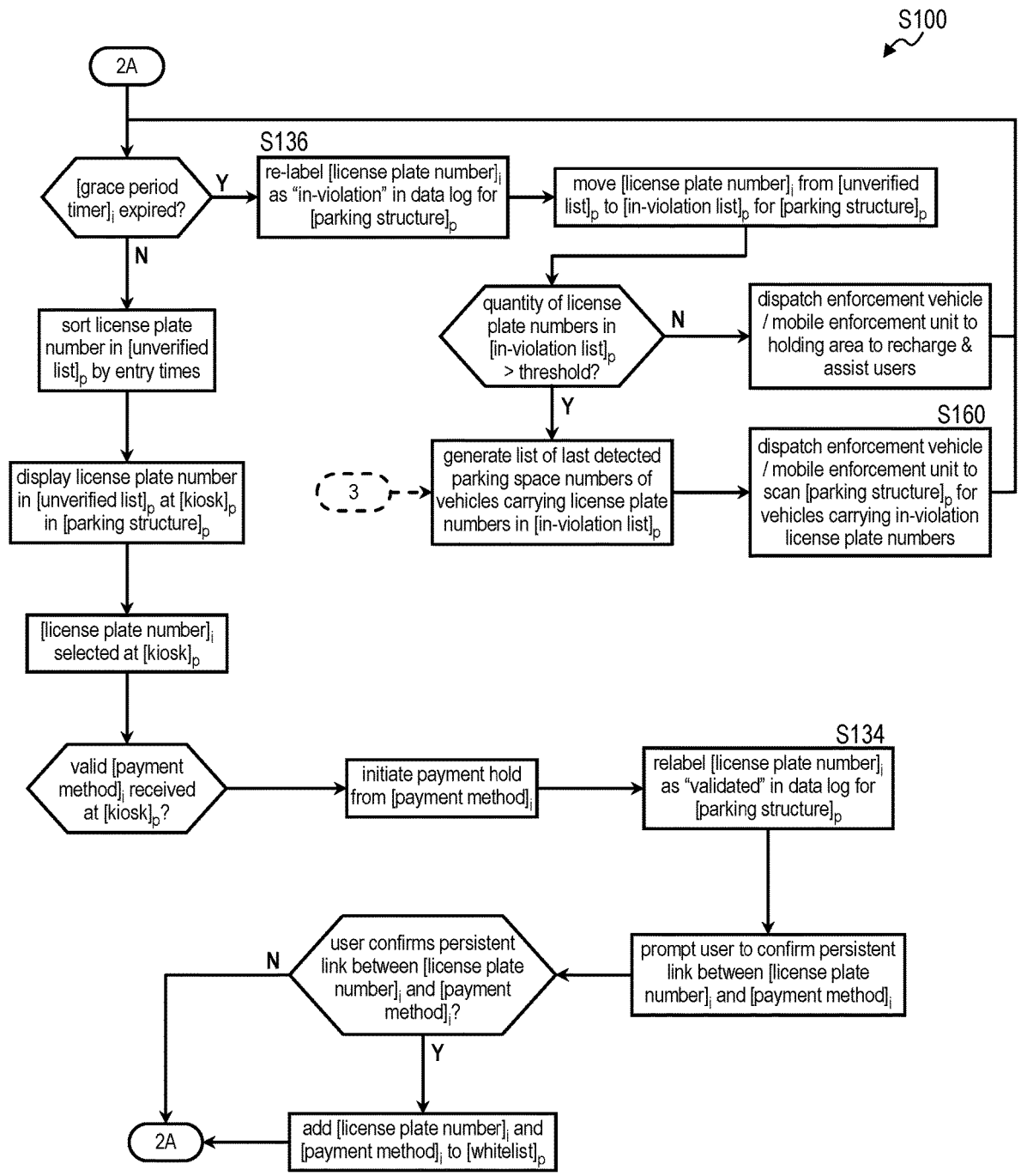

Block S134 of the method S100 recites, in response to receiving identification of the license plate number and submission of a payment method through a physical kiosk associated with the parking structure prior to expiration of the timer: relabeling the license plate number as validated in the data log; and initiating a payment hold, for a maximum daily parking rate in the parking structure, from the payment method. Generally, in Block S134, the system can receive selection of an unverified license plate number and submission of a payment method via the kiosk, initiate payment for parking in the parking structure by a vehicle carrying this license plate number, and update the data log to reflect a validated status of this license plate number, as shown in FIG. 2B.

In one example, after driving into the parking structure, a user parks her vehicle inside the parking structure. If the user does not have a current parking pass for the parking structure or has not previously supplied a payment method for parking in the parking structure, the user walks to the kiosk to supply payment information.

In one implementation, the kiosk renders a prompt—on its display—to enter a license plate number, such as through a touchscreen or keypad. Upon arriving at the kiosk, the user manually enters the license plate number on her vehicle, and the system (e.g., the kiosk or the remote computer system) then queries the data log for the supplied license plate number. If the data log returns confirmation that the license plate number is contained in the data log (i.e., the license plate number supplied by the user matches a license plate number recently detected in an image captured by an entry camera unit installed in the parking structure), the kiosk can then prompt the user to supply payment, such as by dipping a credit card or debit card into a card reader in the kiosk. The system then: charges a maximum daily parking rate (or maximum daily parking rate for the remainder of the current day) to the supplied payment method; and updates the data log to reflect that the license plate number is now validated once payment from the supplied payment method is confirmed.

In the foregoing implementation, as the user enters a string of alphanumeric characters for the license plate number of her vehicle into the kiosk, the kiosk can: query the data log for license plate numbers with the same string of characters; render the set of license plate numbers returned by the data log on the display; and prompt the user to either enter the license plate number in its entirety or select from the set of license plate numbers rendered on the display. The kiosk can similarly: query the data log for license plate numbers with both the same and similar—but not identical—string of characters entered by the user; render this set of license plate numbers returned by the data log on the display; and prompt the user to either enter the license plate number in its entirety or select from the set of license plate numbers rendered on the display.

Additionally or alternatively, the kiosk can: render license plate numbers—of vehicles that recently entered the parking structure and for which payment has not yet been received—on the display; prompt the user to filter this set of license plate numbers by entering characters that she knows are included in her vehicle's license plate number; and then enable the user to select from this filtered list of license plate numbers. For example, the kiosk can: aggregate a list of license plate numbers labeled as unverified in the data log (i.e., license plate numbers of vehicles that recently entered the garage but for which payment or validation by an external entity has not yet been received); order license plate numbers in this list according to their entry times (e.g., according to timestamps of images captured by the entry camera and depicting these license plate numbers); and render this ordered list of license plate numbers on its integrated display. In this example, the kiosk can render these license plate numbers: in a grid array, such as with the license plate number detected most recently in a top-left corner of the display; in a vertical list with most-recent license plate number at a top of the list; or in a vertical or horizontal scrolling bar with the most-recent license plate number displayed first. The physical kiosk can then: receive selection of a license plate number from this ordered list of license plate numbers rendered on the display; receive submission of a payment method associated with the selected license plate number; initiate payment for parking in the parking structure—by a vehicle carrying the selected license plate number—via the supplied payment method in Block S120; and re-label this license plate number as "validated" in the data log in Block S122. The system can thus enable the user to identify her vehicle's license plate number even if she does not remember this license plate number in its entirety.

Similarly, the kiosk can: retrieve representative images (described above) of vehicles that recently entered the parking structure and for which payment has not yet been received; render these representative images on the display; prompt the user to select the representative image that depicts her vehicle; and prompt the user to supply a payment method. For example, the kiosk can: query the data log for a set of license plate numbers that have not yet been validated; retrieve a set of representative images, each associated with one license plate number in this set of unverified license plate numbers; render this set of representative images on the display, such as in chronological order with the most-recent representative image depicted at a top of the display; and enable the user to scroll through this set of representative images to find an particular representative image in which the user recognizes her vehicle. The system can then associate a payment method supplied by the user with the license plate number linked to (e.g., depicted in) the representative image selected by the user.

Furthermore, in the foregoing implementations, the kiosk can update the list of unverified license plate numbers in real-time as license plate numbers are detected in images captured by the entry camera unit or in response to activation of the kiosk by a user (e.g., by touching the display).

In the foregoing implementations, the kiosk can also: present both unverified and in-violation license plate numbers on the display; enable a user to select and remit payment for unverified license plate numbers; and enable a user to select and remit payment for citations issued to an in-violated license plate number, such as if fewer than a threshold quantity of parking citations are outstanding for this license plate number as described below.

7.2 Stored Payment

In one variation as shown in FIG. 2B, the kiosk can also prompt the user to enter contact information in order to receive an electronic receipt, such as a phone number or email address. The kiosk can also prompt the user to elect to store the supplied payment method—linked to the license plate number—for payment for future parking in the parking structure (and in affiliated parking structures) with the same vehicle. If the user thus supplies contact information and elects to store the supplied payment method, the system (e.g., the kiosk or remote computer system) can: generate a new user profile including the license plate number, user contact information, and payment method; and add this license plate number to the whitelist.

For example, in response to detecting a license plate number in an image captured by the entry camera unit at a first time, the system can query the whitelist for this license plate number in Block S110. In response to the whitelist excluding this license plate number, the system can label this license plate number as unverified in the data log in Block S130. The kiosk can then: aggregate a list of license plate numbers labeled as unverified in the data log; present this list of license plate numbers (e.g., on its integrated display); receive selection of the license plate number—by a user—from this list of license plate numbers; receive submission of a payment method—associated with this license plate number—from the user; initiate payment with the supplied payment method; and update the license plate number as "validated" in the data log. The kiosk can also prompt the user to confirm a persistent link between this supplied payment method and this license plate number in order to automate payment for future parking—with a vehicle carrying this license plate number—in the parking structure. Then, in response to the user confirming this persistent link between the supplied payment method and the selected license plate number for future parking in the parking structure, the system can: store the supplied payment method in association with this license plate number; and add the license plate number to the whitelist for the parking structure.

8. Pre-Validation

In one variation shown in FIG. 2A, the method S100 further includes: in response to detecting a license plate number in an image captured by the entry camera unit, querying a pre-validation list—containing license plate numbers designated in pre-validation requests submitted by an external entity—for the license plate number in Block S112; and, in response to the pre-validation list containing the license plate number, labeling the license plate number as validated in the data log in Block S122.

Generally, in this variation, the system supports parking authorization by an external entity (or an external "institution") for vehicles parked in the parking structure. In one example, a user: parks her vehicle in the parking structure; exits the parking structure on foot; enters an institution (e.g., a bank, a restaurant, and store) nearby; and provides her license plate number to a representative of the institution. The representative then enters the license plate number provided by the user into an email (e.g., into a subject heading in the email) and sends this email to an email address monitored by the remote computer system. The system then: identifies the institution based on a domain of a sender of the email; identifies a particular parking structure (or a set of parking structures) for which parking authorization has been enabled for the institution; extracts the license plate number from the email; and queries a data log associated with the particular parking structure for the license plate number to confirm that a vehicle with this license plate number recently entered the parking structure. (If multiple parking structures are affiliated with the institution, the system similarly can query data logs for each of these parking structures both to confirm that a vehicle with this license plate number recently entered one of these parking structures and to identify the particular parking structure occupied by vehicle.) If the data log returns a "true" value for this license plate number, the system can: retrieve a stored payment method affiliated with the institution; charge the institution's stored payment method for a maximum daily parking fee for parking for the parking structure; and update the data log for the parking structure to indicate the license plate number as validated once payment with the institution's payment method is confirmed.

(In this variation, the representative of the institution may enter multiple license plate numbers into the subject line of the email, and the system can then: extract each of these license plate numbers; and execute the foregoing methods and techniques to validate parking for each of these vehicles.)

However, the system can receive and handle electronic communications of any other form or type—such as a form entered via a web browser or a request entered via a native application executing on a computing device associated with a representative of the external institution—to validate parking in the parking structure on behalf of the user.

8.1 Pre-Validation Time Limit

In this variation, the system can also implement a maximum parking authorization time that the institution agrees to pay on behalf of the user. For example, the system can implement a fixed maximum parking authorization time, such as previously specified by the institution (e.g., two hours for a restaurant, thirty minutes for a bank). Alternatively, the system can apply a maximum parking authorization time specified in the authorization email sent by the representative of the institution. For example, the representative may enter both the license plate number supplied by the user and a maximum parking authorization time (e.g., a number of minutes contained in closed brackets) into the subject line of the email; and the system can extract this maximum parking authorization time from the email upon receipt. The system can then charge the institution's payment method for a cost of the fixed or custom maximum parking authorization time. Later, if the system detects that a vehicle with this license plate number left the parking structure before conclusion of the maximum parking authorization time set for or specified by the institution, the system can refund the institution for a difference in cost between this maximum parking authorization time and the actual duration of time that the vehicle with this license plate number occupied the parking structure. If the user also supplied payment for parking in the parking structure—such as via the kiosk when she initially parked in the parking structure, as described above—the system can also issue a full refund to the user.

However, if the system fails to detect a vehicle with this license plate number leaving the parking structure before conclusion of the maximum parking authorization time and the user previously supplied payment for parking in the parking structure, the system can: transition to charging the user's supplied payment method for time that her vehicle remains in the parking structure beyond the maximum parking authorization time set for or specified by the institution; and preserve a "validated" label for the license plate number in the data log. Conversely, if the system fails to detect a vehicle with this license plate number leaving the parking structure before conclusion of the maximum parking authorization time set for or specified by the institution but the user did not previously supply payment for parking in the parking structure, the system can update the data log to indicate that the license plate number is in-violation (or "unauthorized"), such as after an additional grace period of fifteen minutes.

Figure 2C:
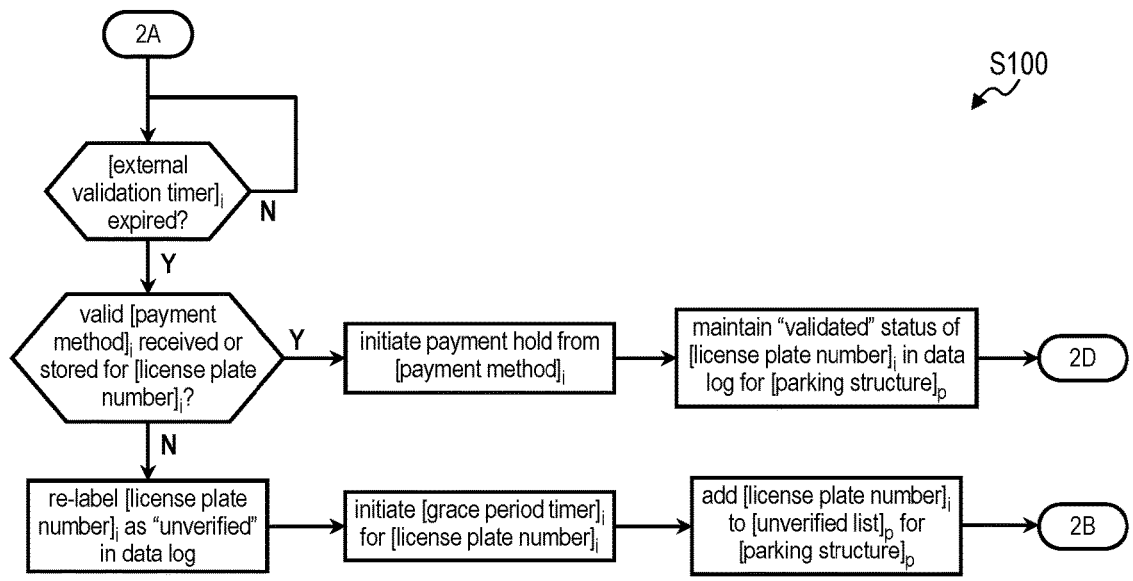
Figure 2D:
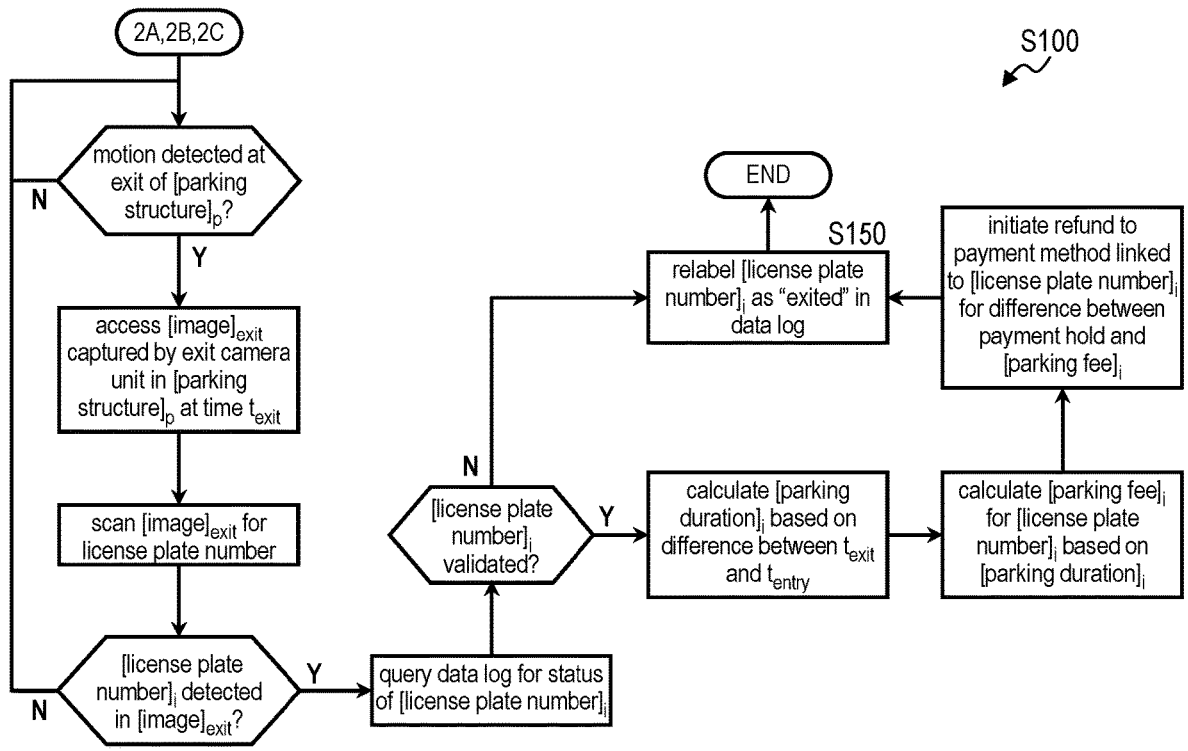

For example and as shown in FIGS. 2A and 2C, the system can: query a pre-validation list for a license plate number detected in an image recently captured by the entry camera unit; label this license plate number as validated in the data log if the pre-validation list contains this license plate number; and initiate a validation timer for a maximum validation duration specified by the external entity (e.g., one hour for a fast food restaurant; two hours for a casual dining restaurant; four hours for a fine dining restaurant). Later, if the system detects this license plate number in an image captured by the exit camera (i.e., if the system determines that this vehicle has left the parking structure) prior to expiration of the validation timer, the system can: initiate payment from the external entity on behalf of the vehicle for the duration of time that the vehicle occupied the parking structure; and update the data log to reflect the vehicle's exit from the parking structure. Conversely, if the system fails to detect this license plate number in an image captured by the exit camera (i.e., if the system determine that this vehicle has not yet left the parking structure) and if an alternate payment method has not yet been supplied for or linked to this license plate number prior to expiration of the validation timer, the system can: initiate payment from the external entity on behalf of the vehicle for the maximum validation duration specified by the external entity; and re-label the license plate number as unverified in the data log.

8.2 Repeat Authorization

In one variation, the system maintains a validation log of license plate numbers validated (or "authorized") by the institution. For example, the system can append the authorization log with a license plate number responsive to an email or other electronic communication from a representative of the institution requesting authorization of the license plate number, as described above.

When the system detects a license plate number on a vehicle entering the parking structure as described above, the system can query the authorization log for this license plate number. If the authorization log returns a "true" value, the system can automatically transmit an electronic communication (e.g., an email)—to a representative of the institution—that: indicates a user for whom the institution previously validated parking has returned to the parking structure; and prompts the representative to re-validate parking on behalf of the user. In this example, the system can also: incorporate a representative images of the user's vehicle (e.g., a low-blur image captured by an entry camera unit when the vehicle entered the parking structure) into the electronic communication; and/or incorporate a name of the user (e.g., extracted from a payment method supplied by the user and thus linked to this license plate number) into the electronic communication in order to enable the representative of the institution to identify the user. The representative may then reply to the electronic communication (e.g., by replying to the email or replying to the email with a "YES" added to the subject line) in order to trigger the system to validate parking for the user with a payment method supplied by the institution, as described above. In this implementation, the representative may also prepare paperwork, prepare refreshments, prepare a conference room, and/or notify associates, etc. of the user's pending arrival responsive to this electronic communication received from the system.

9. "In-Violation" License Plate Numbers

However, if payment for a license plate number is not received at the kiosk or validated by an external entity prior to expiration of a grace period timer associated with the license plate number, the system can update the data log to indicate that the license plate number is "in-violation," as shown in FIG. 2B.

10. Parking Enforcement

One variation of the method S100 shown in FIGS. 2A and 3 further includes: accessing an image feed captured by a mobile camera arranged on the mobile enforcement unit while the mobile enforcement unit moves past vehicles occupying parking spaces in the parking structure in Block S162; scanning images in the image feed for license plate numbers in Block S164; in response to detecting a license plate number in an image in the image feed querying the data log for a status of the license plate number in Block S140; and outputting a notification—indicating absence of parking validation for the license plate number within a grace period duration following entry of the vehicle into the parking structure—in response to the license plate number labeled as in-violation in the data log in Block S142.

Generally, the system can include or interface with a mobile enforcement unit configured to mount to an enforcement vehicle (e.g., a golf cart) driven by the enforcement personnel or configured to be carried by the enforcement personnel while moving throughout the parking structure. While the enforcement personnel drives or carries the mobile enforcement unit along rows of vehicles in the parking structure, the mobile enforcement unit can: capture images of these vehicles; implement methods and techniques described above to detect and extract license plate numbers from these images; query the data log with these license plate numbers to check parking authorization status of these vehicles; and then output an audible and/or visual alert—in real-time—as the mobile enforcement unit passes a particular vehicle with a license plate number flagged as unverified with grace period expired in the data log, thereby prompting the enforcement personnel to issue a parking citation to the particular vehicle. The mobile enforcement unit can therefore automatically check the status of vehicles parked in the parking structure and automatically alert the enforcement personnel of violations in real-time as the mobile enforcement unit moves past these vehicles, thereby enabling the enforcement personnel to avoid manual checking of individual vehicles and instead enable the enforcement personnel to seamlessly monitor the parking structure and quickly issue parking citations for violating vehicles. For example, the mobile enforcement unit can include: a tablet computer containing a camera, a processor, a wireless communication module, and an audio speaker; and a mount configured to locate the tablet on an enforcement vehicle with the camera facing outwardly from the right side of the enforcement vehicle.

10.1 Mobile Scanning

In one implementation shown in FIG. 2A, the enforcement personnel may navigate the enforcement vehicle throughout the parking structure, and the mobile enforcement unit can concurrently: record a stream of images via the camera; and locally process these images to extract license plate numbers depicted in these images, such as according to methods and techniques described above.

10.2 Vehicle Status Detection

In one implementation shown in FIG. 3, as the mobile enforcement unit detects each subsequent license plate number in this stream of images, the mobile enforcement unit can transmit a series of queries—to the kiosk or remote computer system via a local ad hoc wireless network or cellular network—for statuses of these license plate numbers stored in the data log. The kiosk or remote computer system can then return a status for each license plate number received from the mobile enforcement unit, such as one of: "validated"; "unverified and in grace period"; "in-violation" (i.e., unverified with grace period expired); or "citation issued" (e.g., unverified with grace period expired and citation already issued).

Alternatively, the mobile enforcement unit can store a local copy of the data log, update the data log responsive to updates received from the kiosk or remote computer system as vehicles are detected entering and exiting the parking structure, and query this local copy of the data log for license plate number statuses. Yet alternatively, the kiosk or remote computer system can transmit license plate numbers of "in-violation" vehicles to the mobile enforcement unit as grace periods associated with these unverified license plate numbers expire; and the mobile enforcement unit can maintain a local in-violation log based on license plate numbers received from the kiosk or remote computer system, query this in-violation log with license plate numbers as the mobile enforcement unit detects these license plate numbers, and identify an in-violation vehicle when the in-violation log returns a "true" value.

In these implementations, if wireless connectivity to the kiosk or remote computer system is limited in the parking structure, the mobile enforcement unit can alternatively wirelessly synchronize its local copy of the data log or the local in-violation log with a master data log stored on the kiosk or remote computer system each time the mobile enforcement unit is driven past the kiosk by the enforcement vehicle or each time wireless connectivity is otherwise established with the kiosk. In this implementation, the mobile enforcement unit can also: synchronize grace period timers for unverified license plate numbers in its local data log or local in-violation log when the enforcement vehicle drives the mobile enforcement unit past the kiosk; monitor these grace period timers; and automatically update license plate numbers with "in-violation" flags when their corresponding grace period timers expire.

10.3 Audible Cues

When the data log (or in-violation log) returns an "in-violation" status of a license plate number, the mobile enforcement unit can output an audible alarm to prompt the enforcement personnel to stop the enforcement vehicle and issue a parking citation to the corresponding vehicle.

In one implementation shown in FIG. 3, the mobile enforcement unit outputs this audible alarm in the form of a continuous audible tone while a license plate number with an "in-violation" status falls within a center-third of the field of view of the camera (i.e., is detected within the center-third of a last image captured by the camera), thereby enabling the enforcement personnel to quickly identify the offending vehicle by looking laterally past the mobile enforcement unit while the mobile enforcement unit is outputting the audible tone. In a similar example, when the data log (or in-violation log) returns an "in-violation" status of a license plate number detected in the field of view of the camera, the mobile enforcement unit can output an intermittent audible tone at a frequency that varies inversely with distance of the license plate number detected in a last image captured by the camera from a lateral center of this image. More specifically, the mobile enforcement unit can output this audible tone at a frequency: that increases as the mobile enforcement unit detects the "in-violation" license plate number entering the field of view of the camera and approaching the lateral center of the field of view of the camera; the peaks when the mobile enforcement unit detects the "in-violation" license plate number aligned with the lateral center of the field of view of the camera; and that decreases as the mobile enforcement unit detects the "in-violation" license plate number moving toward an edge of the field of view of the camera as the enforcement vehicle drives past the offending vehicle, thereby enabling the enforcement personnel to quickly identify the offending vehicle based on lateral alignment of the mobile enforcement unit to the offending vehicle when the frequency of the audible tone peaks.

In the foregoing implementation, the mobile enforcement unit can implement similar methods and techniques to identify an unverified license plate number that is currently in grace period and to output a different audible alarm to preemptively inform the enforcement personnel of a possible future parking violation. While the enforcement personnel may not stop to issue a citation to this vehicle, the enforcement personnel may take mental note of a possible future parking violation by this vehicle and prioritize rescanning this same vehicle during a future route through this parking structure in order to confirm whether parking has been validated for this vehicle.

In another implementation, the mobile enforcement unit can detect a license plate number in an image captured by the mobile enforcement unit and retrieve a status of this license plate number from the data log as the mobile enforcement unit moves past a vehicle carrying this license plate number. Then, in Block S142, the mobile enforcement unit can: output a first audible notification—indicating an in-violation status of the license plate number—in response to the license plate number labeled as in-violation in the data log; output a second audible notification—different from the first audible notification and representing confirmation of parking validation for the license plate number—in response to the license plate number labeled as validated in the data log; or output a third audible notification—different from the first and second audible notifications and indicating that the license plate number is currently unverified (i.e., currently in a grace period)—in response to the license plate number labeled as unverified in the data log in (near) real-time as the mobile enforcement unit passes this license plate number. In this implementation, in response to failure to read a license plate number—with at least a minimum confidence—in a contiguous sequence of images captured by the mobile enforcement unit, the mobile enforcement unit can outputting a fourth audible notification—different from the first, second, and third audible notifications—in order to prompt the enforcement personnel to reverse the enforcement vehicle and rescan this license plate number.

In the foregoing implementation, the mobile enforcement unit can also render—on an integrated or connected display—textual or graphical notifications corresponding to these audible notifications. For example, the mobile enforcement unit can render: a live feed of license plate numbers detected in an image feed captured by the mobile enforcement unit camera; and a detection confidence score, a detection time, and a status of each of these license plate numbers. In this example, the mobile enforcement unit can also: highlight—in this live feed—each detected license plate number with an in-violation status; and render a prompt to confirm generation of a parking citation for each of these in-violation license plate numbers.

However, the mobile enforcement unit can communicate statuses of license plate numbers—passed by the mobile enforcement unit—in real-time to the enforcement personnel through any other audible, visual, and/or haptic notifications. Thus, upon perceiving these audible, visual, and/or haptic notifications, the enforcement personnel may quickly elect to stop the enforcement vehicle in order to place a citation on an in-violation vehicle, mentally log a location of an unverified vehicle, or continue to drive the enforcement vehicle forward (i.e., without stopping) to scan a license plate number on a next vehicle in the parking structure.

10.4 Citation Support

Therefore, when the enforcement personnel hears an audible alarm indicating that an "in-violation" license plate number is nearby, the enforcement personnel may stop the enforcement vehicle, view the display on or coupled to the mobile enforcement unit to verify the in-violation license plate number, and then exit the enforcement vehicle to issue a parking citation to the offending vehicle. The enforcement personnel may also select the in-violation license plate number on the display in order to clear the alarm and to indicate that a parking citation has been issued to the offending vehicle. Responsive to this input from the enforcement personnel, the mobile enforcement unit can return verification of the issued citation to the kiosk or remote computer system; and the kiosk or remote computer system can then update the data log accordingly to reflect issuance of a citation to the license plate number (e.g., by marking the license plate number as "citation issued" in the data log). Alternatively, mobile enforcement unit can update its local copy of the data log or the local in-violation log responsive to confirmation from the enforcement personnel that the citation has been issued; and the mobile enforcement unit can later wirelessly synchronize its local copy of the data log or the local in-violation log to the master data log stored on the kiosk or remote computer system when the mobile enforcement unit is again driven past the kiosk by the enforcement vehicle.

In one variation, the mobile enforcement unit includes or is coupled to a printer arranged in the enforcement vehicle. In this variation, the mobile enforcement unit can: automatically populate a digital copy of a citation with the in-violation license plate number, an identifier of the parking structure (and the location or parking space number currently occupied by the vehicle), the entry time of the vehicle, and the current time; and then queue the printer to print this citation, as shown in FIG. 3. The enforcement personnel may then place this printed citation on the corresponding vehicle. For example, the mobile enforcement unit can automatically print a citation via the connected printer: when the mobile enforcement unit detects this "in-violation" license plate number in the field of view of the camera; when the enforcement vehicle has stopped soon after the mobile enforcement unit issues an audible alarm for the "in-violation" license plate number (e.g., as detected based on outputs of an IMU integrated into the mobile enforcement unit that indicates that the enforcement vehicle has stopped); and/or when the enforcement personnel manually confirms the parking citation via the display.

10.5 Citation Confirmation

In one variation shown in FIG. 3, upon detecting an in-violation license plate number on a nearby vehicle, the mobile enforcement unit prompts the enforcement personnel to either confirm issuance of the citation or to cancel the citation, such as by rendering an "issue" option and a "cancel" option on its integrated or connected display. Then, in response to the enforcement personnel confirming the citation for the in-violation vehicle, the mobile enforcement unit can: queue the printer to print a paper citation for this vehicle; and re-label the license plate number as "citation issued" in the data log. Conversely, in response to the enforcement personnel declining the citation for the first vehicle, the mobile enforcement unit can: prompt the operator to supply a reason for declining the citation for the first vehicle; generate a review file containing the enforcement personnel identifier, the enforcement personnel's reason for canceling the citation, the in-violation license plate number, and an image of the corresponding vehicle; upload the review file to a remote database; and re-label the license plate number as "citation canceled" in the data log. The system can then schedule the review file for review by a supervisor and serve this review file to a supervisor portal, such as within a web browser or native application; the supervisor may then confirm cancellation of the citation or discipline the enforcement personnel for improperly canceling the citation. The system can implement similar methods and techniques to generate a review file and to schedule evaluation of the review file if the enforcement personnel fails to either confirm or cancel the citation.

Therefore, in this variation, the system can reinforce compliance by the enforcement personnel by automatically scheduling review of enforcement personnel actions (and inaction) that conflict with enforcement rules defined for the parking structure.

10.6 License Plate Number Map

In one variation shown in FIG. 3, the system (e.g., the mobile enforcement unit) can populate a map or other representation of the parking structure with locations (e.g., parking space numbers) of license plate numbers last detected in images captured by the mobile enforcement unit.

For example, the mobile enforcement unit can record or estimate its location within the parking structure over time: based on outputs of a geospatial position sensor integrated into the mobile enforcement unit; by implementing simultaneous localization and mapping techniques; and/or by detecting optical fiducials arranged throughout the parking structure in images captured by the mobile enforcement unit. In this example, upon detecting a license plate number in an image captured by the mobile enforcement unit, the system (e.g., the mobile enforcement unit, the kiosk) can: query a map of the parking structure for a parking structure identifier, parking structure level, parking row, and/or particular parking space number proximal the location of the mobile enforcement unit at the time the license plate number was detected; and store this parking structure identifier, parking structure level, parking row, and/or or particular parking space number—which represents the last detected location of the license plate number—with this license plate number in the data log.

In another example, the mobile enforcement unit can capture an image and scan the image for a license plate number, as described above. In response to detecting a license plate number in this image, the mobile enforcement unit can: scan a region of the image below the detected license plate number for a parking space number; and store this parking space number—which represents the last detected location of the license plate number—with this license plate number in the data log.

In the foregoing examples, the system can also maintain a map (or list, etc.) of parking spaces in the parking structure and annotate the map to indicate occupied and unoccupied parking spaces. Furthermore, when the system detects this license plate number in an image captured by the exit camera unit or detects absence of a license plate number in a subsequent image of this parking space, the system can update the map of the parking structure to indicate that the parking space last occupied by this license plate number is now unoccupied.

However, the system can implement any other method or technique to detect and store locations of license plate numbers throughout the parking structure.

10.7 Towing Support

In another variation shown in FIG. 3, the system automatically schedules towing for an in-violation vehicle, such as if the license plate number carried by this vehicle is associated with more than a threshold number of parking citations (e.g., three unpaid parking citations, including the parking citation recently issued to the vehicle).

In one implementation, the mobile enforcement unit scans images—in an image feed captured by its integrated camera—for license plate numbers, as described above. In response to detecting a license plate number in this image feed, the mobile enforcement unit retrieves both a status of the license plate number and a quantity of outstanding parking citations issued to the license plate number from the data log. If the quantity of outstanding parking citations issued to this license plate number exceeds a threshold quantity defined for this parking structure, the system can: implement methods and techniques described above to access or estimate a current location of the mobile enforcement unit in the parking structure (e.g., the parking structure, the parking structure level, and the parking row); or identify a particular parking space number occupied by the in-violation vehicle. The system can then: generate a tow request to tow the vehicle carrying this license plate number proximal the current location of the mobile enforcement unit in the parking structure or occupying the particular space number in the parking structure; and then serve this tow request to a towing service. For example, the system can transmit this tow request to the towing service in the form of an email, a SMS text message, or a robo-call.

Alternatively, the mobile enforcement unit can support the enforcement personnel in manually requesting towing from the towing service. For example, the mobile enforcement unit can retrieve and display: its location or the particular parking space number occupied by the in-violation vehicle; the license plate number of the in-violation vehicle; a phone number for the towing service; and a prompt to call the towing service to request towing of this vehicle.

Therefore, by detecting or estimating the location of an in-violation vehicle in the parking structure and tracking a quantity of outstanding citations issued to this vehicle, the system can support towing of in-violation vehicles according to parking and enforcement rules for the parking structure with limited input or effort from the enforcement personnel.

10.8 Multiple Mobile Enforcement Units

In yet another variation, a second mobile enforcement unit is arranged on the enforcement vehicle with the field of view of its camera facing outwardly from the left side of the enforcement vehicle. The (first) mobile enforcement unit and the second mobile enforcement unit can thus simultaneously execute the foregoing methods and techniques to detect and indicate "in-violation" vehicles on both the left and right sides of the enforcement vehicle as the enforcement personnel drives the enforcement vehicle through the parking structure.

10.9 Selective/Targeted Mobile Enforcement Unit Deployment

In one variation shown in FIG. 2A, the system selectively deploys the enforcement personnel—including the mobile enforcement unit and the enforcement vehicle—to scan a particular parking structure, level in the parking structure, row in the parking structure, or a particular parking space in the parking structure based on the status of vehicles that entered but have not exited the parking structure.

In one implementation, the system monitors a quantity of license plate numbers: of vehicles that entered but have not yet exited the parking structure; and labeled as in-violation in the data log. When the quantity of in-violation license plate numbers on vehicles in this parking structure is below a threshold quantity defined for this parking structure, the mobile enforcement unit can prompt the enforcement personnel to park the enforcement vehicle in a holding area, such as: near a kiosk in the parking structure in order to assist users parking in this parking structure; and/or in a recharging booth in order to recharge the enforcement vehicle. However, when quantity of license plate numbers labeled as in-violation in the parking structure exceeds a threshold quantity, the system can automatically dispatch the enforcement personnel to this parking structure to scan license plate numbers of vehicles occupying the parking structure. For example, as grace period times for license plate numbers that recently entered the parking structure expire prior to validation or receipt of payment, the system can update the data log to reflect transition from unverified to in-violation status of these license plate numbers. Then, when the quantity of in-violation license plate numbers in the parking structure exceeds a threshold quantity of four (or 1% of vehicles parked in the parking structure; or 2% of the total quantity of parking spaces in the parking structure), the mobile enforcement unit can display a visual notification and/or output an audible prompt to scan this parking structure.

In the variation described above in which the system stores locations of license plate numbers in the parking structure, the system can also: aggregate a list of in-violation license plate numbers (and unverified license plate numbers with grace period timer soon to expire); retrieve last known locations (e.g., parking structure level and row; or parking space number) of each of these in-violation license plate numbers; and sort these license plate numbers by proximity to the entrance of the parking structure or by proximity to the enforcement vehicle. The mobile enforcement unit can then present this list of in-violation license plate numbers and their locations in the parking structure with a prompt to navigate to and issue citations to these vehicles in the order presented.

In a similar implementation in which the enforcement personnel monitors multiple parking structures, the system can implement similar methods and techniques to selectively dispatch the enforcement personnel to particular parking structures. For example, the system can implement methods and techniques described above to monitor statuses of vehicles that have entered but not yet exited a set of (e.g., four) parking structures assigned to a particular enforcement personnel and mobile enforcement unit. When quantities of in-violation license plate numbers on vehicles in each of these parking structures remains below threshold quantities defined for these parking structure, the mobile enforcement unit can prompt the enforcement personnel to park the enforcement vehicle in a holding area, such as near a kiosk in a particular parking structure—in this set of parking structures—exhibiting a highest rate of entering vehicles in order to assist users paying for parking in this parking structure. However, when the quantity of license plate numbers occupying a first parking structure in this set and labeled as in-violation exceeds a threshold quantity assigned to the first parking structure, the system can dispatch the enforcement personnel to scan this first parking structure. As the enforcement personnel completes a scan of the first parking structure, the system can: calculate quantities of in-violation license plate numbers in other parking structures monitored by the enforcement personnel; rank these parking structures by quantities of in-violation license plate numbers contained therein; and dispatch the enforcement personnel to scan these parking structures in order of in-violate license plate number quantity. Once the enforcement personnel completes a scan of each of these parking structures, the system can prompt the enforcement personnel to return to a holding area, such as to assist users attempting to pay for parking in one of these parking structures and/or to recharge the enforcement vehicle.

Therefore, in this implementation, the system can: schedule the enforcement personnel and the mobile enforcement unit to scan license plate numbers of vehicles occupying a first parking structure containing a highest quantity of in-violation vehicles during a first period of time; and schedule the mobile enforcement unit to scan license plate numbers of vehicles occupying a second parking structure containing a lesser quantity of in-violation vehicles at a later time.

However, the system can selectively prompt, queue, or schedule the enforcement personnel and the mobile enforcement unit to scan particular parking spaces, parking rows, parking levels, or parking structures based on statuses of license plate numbers in a set of parking structures and any other schema.

10.10 Parking Space Sensor

In one variation, the system includes or interfaces with parking space sensors installed over, on, or under parking spaces in the parking structure. For example, the parking structure can be outfitted with an induction-sensing, wireless-enabled parking space sensor installed (or "buried") under the surface of a parking space or adhered or fastened to the surface of the parking space. In this example, the parking space sensor can wirelessly broadcast a status of this parking space—such as "occupied" or "open" in response to the status of the parking space changing—directly to the kiosk or to a remote computer system. However, the parking structure can be outfitted with induction-, load-, motion-, or image-based parking space sensors in any other way. The system can thus monitor statuses of parking spaces throughout the parking structure based on statutes broadcast by these parking space sensors.

In one implementation, the system can predict one or a small subset of parking spaces in the parking structure that a vehicle recently entered based on: the vehicle's entry time into the parking structure; times that statuses of parking space sensors in the parking structure changed from "open" to "occupied" after this entry time; known locations of parking spaces assigned to these parking space sensors; and/or distances from the entrance of the parking structure to these parking spaces. For example, the system can aggregate a list of parking spaces (e.g., a list of parking space numbers) paired with parking space sensors that changed state from "open" to "occupied" during a period of ten minutes following the vehicle's time of entry into the parking structure. In this example, the system can further filter or rank this list of parking spaces based on distance from the entrance of the parking structure, such as: by ranking these parking spaces by proximity to the parking structure entrance (e.g., based on an expectation that drivers will elect the first viable parking space available); and/or by ranking these parking spaces by proximity to the kiosk, an elevator, or a stairwell (e.g., based on an expectation that drivers will elect most-convenient parking spaces).

In this implementation, if this vehicle remains unverified upon conclusion of the grace period following its entry time at the parking structure, the system can deploy the mobile enforcement unit to the parking structure with a prompt to specifically scan this subset of parking spaces that are most likely occupied by this vehicle, thereby enabling the mobile enforcement unit to rapidly find the vehicle and issue a citation. For example, the system can populate a map of the parking structure with locations of parking spaces predicted to contain the vehicle and return this annotated map to the mobile enforcement unit or to the employment personnel directly. In another example, the system can generate a list of parking space numbers of spaces predicted to contain the vehicle and return this list of parking space numbers to the mobile enforcement unit or to the employment personal directly.

Therefore, by monitoring status changes of parking spaces throughout the structure, the system can: predict particular locations likely occupied by an unverified vehicle in the parking structure; and deploy or prompt the mobile enforcement unit to specifically search for this unverified vehicle in these particular locations.

11. Onsite Citation Forgiveness

In another variation shown in FIG. 3, the system can enable a user to remit payment for parking and/or for a citation following receipt of a parking citation.

In one implementation, the kiosk: accesses a list of license plate numbers labeled as "citation issued" in the data log; retrieves quantities of outstanding citations to each of these citation-issued license plate numbers; and filters this list of license plate numbers to include only those citation-issued license plate numbers with fewer than a threshold quantity of (e.g., two) outstanding (i.e., unpaid) citations. The kiosk then: displays this filtered list of citation-issued license plate numbers, a list of in-violation license plate numbers, and unverified license plate numbers (and/or images of vehicles carrying these license plate numbers); and enables users to select from these displayed license plate numbers. Thus, if a user selects an unverified or in-violation license plate number at the kiosk, the system can execute methods and techniques described above to: initiate payment (or a payment hold) for parking via a payment method submitted by this user; and re-label this license plate number as validated in the data log. (The system can also add a surcharge for late payment responsive to selection of an in-violation license plate number.) Similarly, if the user selects a citation-issued license plate number, the system can: retrieve a current citation fee for each outstanding parking citation issued to this license plate number; prompt the user to confirm payment of each citation fee; initiate payment for each confirmed citation fee via a payment method submitted by this user; re-label the license plate number as validated or "citation paid" in the data log; and clear each parking citation—linked to this license plate number—thus paid by the user.

In another implementation, the kiosk can: receive an identifier of a citation issued to a vehicle (e.g., a citation number printed on the citation, a license plate number of the vehicle) entered by a user; and retrieve a quantity of citations issued to this license plate number based on the identifier. Then, if the quantity of citations issued to this license plate number is less than a threshold quantity specified for the parking structure (or if a vehicle carrying this license plate number was not previously identified in the parking structure), the kiosk can: forgive the citation and cancel the citation accordingly; enable submission of a payment method at the physical kiosk; and initiate payment (e.g., a payment hold) for the vehicle parking in the parking structure with the payment method accordingly. Conversely, if the quantity of citations issued to this license plate number is greater than the threshold quantity specified for the parking structure, the kiosk can indicate that the citation is maintained and prompt the user to submit payment for any outstanding citations, as described above.

Therefore, in this implementation, the system can: cancel citations and enable retroactive payment for parking in the parking structure for license plate numbers with few or new outstanding citations, which may correlate with users who are not familiar with payment rules in the parking structure; but preserve citations issued to repeat offenders.

12. Exiting Vehicle

As described above and as shown in FIG. 2D, the system can also detect license plate numbers in images captured by an exit camera unit installed in the parking structure and can store exit times of these license plate numbers. In one implementation, upon detecting a license plate number in an image captured by the exit camera unit, the system queries the data log for the entry time and status of the license plate number. If the data log returns a validated status for the license plate number, the system can: calculate a time difference between the entry time and the exit time of the license plate number; implement a parking fee model to transform this time difference into a final parking cost for the license plate number; calculate a cost difference between this final parking cost and a fee charged to the associated payment method for this parking period; and issue a refund for this cost difference to the associated payment method.

For example, in response to detecting the a license plate number in an image captured by the exit camera unit, the system can: label this license plate number as "exited" in the data log in Block S150; calculating a parking fee for the license plate number based on a time difference between its entry time and exit time; and credit an overpayment to a payment method linked to the license plate number based on a monetary difference between this parking fee and a payment hold previously initiated to this payment method.

Finally, the system can clear the license plate number from the data log such that the data log contains license plate numbers of vehicles currently occupying the parking structure.

12. Street Parking

In another variation, the system can execute Blocks of the method to monitor and support parking enforcement for on-street parking. For example, the system can include or interface: with underground vehicle sensors to detect vehicles entering and exiting on-street parking spaces; and/or with pole- or building mounted cameras to detect vehicles entering and exiting on-street parking spaces and to read license plate numbers of these vehicles. In this variation, the system can also interface with parking meters or on-street parking kiosks to present license plate numbers recently detected on parked vehicles and to receive payment methods—in association with these parking spaces and/or license plate numbers—from users. The system can then interface with the mobile enforcement unit, as described above: to detect license plate numbers on parked vehicles occupying on-street parking spaces; to retrieve statuses of these license plate numbers; and to selectively prompt the enforcement personnel to selectively issue parking citations to in-violation vehicles occupying these parking spaces.

For example, in the implementation described above in which the system supports an enforcement personnel and mobile enforcement unit in monitoring multiple parking structures, the system can execute the foregoing methods and techniques to monitor statuses of vehicles occupying on-street parking spaces between and/or near these parking structures. In this example, the enforcement personnel and the mobile enforcement unit can thus monitor and enforce parking rules both across multiple parking structure and on-street parking spaces concurrently.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for managing parking within a parking structure comprising:
   in response to detecting a first license plate number in a first image captured by an entry camera unit arranged near an entry of the parking structure, querying a whitelist for the first license plate number;
   in response to the whitelist excluding the first license plate number:
      labeling the first license plate number as unverified in a data log associated with the parking structure;
      initiating a timer, associated with the first license plate number, for a duration of a grace period; and
   in response to expiration of the timer prior to validation of the first license plate number, relabeling the first license plate number as in-violation in the data log;
   in response to detecting the first license plate number in a second image captured by a mobile enforcement unit moving through the parking structure, querying the data log for a status of the first license plate number;
   in response to the first license plate number labeled as in-violation in the data log, serving a prompt to an enforcement personnel associated with the mobile enforcement unit to issue a citation to a first vehicle carrying the first license plate number; and
   in response to detecting the first license plate number in a third image captured by an exit camera unit arranged near an exit of the parking structure, labeling the first license plate number as exited in the data log.

2. The method of claim 1, further comprising, in response to a quantity of license plate numbers labeled as in-violation in the data log exceeding a threshold quantity, dispatching the mobile enforcement unit to the parking structure to scan license plate numbers of vehicles occupying the parking structure.

3. The method of claim 1, further comprising:
   in response to detecting a second license plate number in a third image captured by a second entry camera unit arranged near a second entry of a second parking structure, querying a second whitelist for the second license plate number;
   in response to the second whitelist excluding the second license plate number:
      labeling the second license plate number as unverified in a second data log associated with the second parking structure;
      initiating a second timer, associated with the second license plate number, for the duration of the grace period; and
      in response to expiration of the second timer prior to validation of the second license plate number, relabeling the second license plate number as in-violation in the second data log; and
   in response to a first quantity of license plate numbers labeled as in-violation in the data log associated with the parking structure exceeding a second quantity of license plate numbers labeled as in-violation in the second data log associated with the second parking structure:
      scheduling the mobile enforcement unit to scan license plate numbers of vehicles occupying the parking structure during a first period of time; and
      scheduling the mobile enforcement unit to scan license plate numbers of vehicles occupying the second parking structure during a second period of time succeeding the first period of time.

4. The method of claim 1, further comprising:
   in response to detecting a second license plate number in a third image captured by the entry camera unit, querying the whitelist for the second license plate number; and in response to the whitelist containing the second license plate number:
    initiating payment for parking in the parking structure via a stored payment method associated with the second license plate number; and
    labeling the second license plate number as validated in the data log.

5. The method of claim 1, further comprising:
in response to detecting a second license plate number in a third image captured by the entry camera unit at a first time, querying the whitelist for the second license plate number; and
in response to the whitelist excluding the second license plate number:
    labeling the second license plate number as unverified in the data log associated with the parking structure; and
    initiating a second timer, associated with the second license plate number, for the duration of the grace period;
in response to receiving identification of the second license plate number and submission of a second payment method through a physical kiosk associated with the parking structure prior to expiration of the second timer:
    relabeling the second license plate number as validated in the data log; and
    initiating a payment hold, for a maximum daily parking rate in the parking structure, from the second payment method; and
in response to detecting the second license plate number in a fourth image captured by the exit camera unit at a second time:
    labeling the second license plate number as exited in the data log;
    calculating a parking fee for the second license plate number based on a time difference between the first time and the second time; and
    crediting an overpayment to the second payment method based on a monetary difference between the parking fee and the payment hold.

6. The method of claim 5, further comprising:
aggregating a list of license plate numbers labeled as unverified in the data log, the list of license plate numbers comprising the second license plate number;
aggregating a set of images captured by the entry camera, each image in the set of image depicting a license plate number in the set of license plate numbers;
presenting the list of license plate numbers through the physical kiosk; and
receiving identification of the second license plate number in the form of selection of an image depicting the second license plate number, from the set of images, at the physical kiosk.

7. The method of claim 1, further comprising:
in response to detecting a second license plate number in a third image captured by the entry camera unit at a first time, querying the whitelist for the second license plate number; and
in response to the whitelist excluding the second license plate number, labeling the second license plate number as unverified in the data log; and
aggregating a list of license plate numbers labeled as unverified in the data log, the list of license plate numbers comprising the second license plate number;
ordering the license plate numbers, in the list of license plate numbers, according to timestamps of images captured by the entry camera and depicting license plate numbers in the list of license plate numbers;
presenting the list of license plate numbers through a physical kiosk associated with the parking structure;
via the physical kiosk:
    receiving selection of the second license plate number from the list of license plate numbers; and
    receiving submission of a second payment method associated with the second license plate number; and
in response to receiving identification of the second license plate number and submission of the second payment method via the physical kiosk:
    initiating payment for parking in the parking structure, by a second vehicle carrying the second license plate number, via the second payment method; and
    labeling the second license plate number as validated in the data log.

8. The method of claim 1, further comprising:
in response to detecting a second license plate number in a third image captured by the entry camera unit at a first time period, querying the whitelist for the second license plate number; and
in response to the whitelist excluding the second license plate number, labeling the second license plate number as unverified in the data log; and
aggregating a list of license plate numbers labeled as unverified in the data log, the list of license plate numbers comprising the second license plate number;
presenting the list of license plate numbers through a physical kiosk associated with the parking structure;
via the physical kiosk:
    receiving selection of the second license plate number from the list of license plate numbers;
    receiving submission of a second payment method associated with the second license plate number; and
    prompting confirmation of a link between the second payment method and the second license plate number for future parking in the parking structure;
in response to receiving identification of the second license plate number and submission of the second payment method via the physical kiosk:
    initiating payment for parking in the parking structure, by a second vehicle carrying the second license plate number, via the second payment method; and
    labeling the second license plate number as validated in the data log; and
in response to confirmation of the link between the second payment method and the second license plate number for future parking in the parking structure, storing the second payment method in association with the second license plate number.

9. The method of claim 1, further comprising:
accessing an image feed captured by a mobile camera arranged on the mobile enforcement unit while the mobile enforcement unit moves past vehicles occupying parking spaces in the parking structure;
scanning images in the image feed for license plate numbers; and
in response to detecting a license plate number in an image in the image feed:
    querying the data log for a status of the license plate number;
    in response to the license plate number labeled as verified in the data log, outputting a first audible notification to the enforcement personnel occupying the mobile enforcement unit; and in response to the license plate number labeled as in-violation in the data log, outputting a second audible notification, different from the first audible notification, to the enforcement personnel.

10. The method of claim 9, further comprising:
in response to detecting a license plate number in the image and in response to the license plate number labeled as un-verified in the data log, outputting a third audible notification, different from the first audible notification and the second audible notification, to the enforcement personnel; and
in response to failure to read a license plate number in a contiguous sequence of images in the image feed, outputting a fourth audible notification, different from the first audible notification, the second audible notification, and the third audible notification, to prompt the enforcement personnel to rescan the license plate number.

11. The method of claim 1, further comprising:
accessing an image feed captured by a mobile camera arranged on the mobile enforcement unit while the mobile enforcement unit moves past vehicles occupying parking spaces in the parking structure;
scanning images in the image feed for license plate numbers; and
detecting the first license plate number in the second image in the image feed;
in response to the enforcement personnel confirming the citation for the first vehicle carrying the first license plate number, queuing a printer in the mobile enforcement unit to print a paper citation specifying the first license plate number; and
in response to the enforcement personnel declining the citation for the first vehicle:
 prompting the operator to supply a reason for declining the citation for the first vehicle; and
 scheduling the reason for review by a supervisor.

12. The method of claim 1, further comprising:
accessing an image feed captured by a mobile camera arranged on the mobile enforcement unit while the mobile enforcement unit moves past vehicles occupying parking spaces in the parking structure;
scanning images in the image feed for license plate numbers; and
in response to detecting the first license plate number in the second image in the image feed, retrieving a quantity of outstanding parking citations issued to the first license plate number; and
in response to the quantity of outstanding parking citations issued to the first license plate number exceeding a threshold quantity:
 accessing a current location of the mobile enforcement unit in the parking structure;
 generating a tow request to tow the first vehicle carrying the first license plate number proximal the current location of the mobile enforcement unit in the parking structure; and
 serving the tow request to a towing service.

13. The method of claim 1, further comprising:
receiving an identifier of the citation issued to the first vehicle at a physical kiosk associated with the parking structure;
accessing a quantity of citations issued to the first license plate number based on the identifier; and
in response to the quantity of citations issued to the first license plate number falling below a threshold quantity:
 enabling submission of a payment method at the physical kiosk;
 initiating payment for the first vehicle parking in the parking structure with the payment method; and
 canceling the citation.

14. The method of claim 1:
further comprising, in response to detecting the first license plate number in the first image, querying a pre-validation list for the first license plate number, the pre-validation list comprising a list of license plate numbers designated in pre-validation requests submitted by an external entity;
wherein labeling the first license plate number as unverified in the data log comprises labeling the first license plate number as unverified in the data log further in response to the pre-validation list excluding the first license plate number; and
further comprising:
 in response to detecting a second license plate number in a third image captured by the entry camera unit, querying the pre-validation list for the second license plate number; and
 in response to the pre-validation list containing the second license plate number, labeling the second license plate number as validated in the data log.

15. The method of claim 14, further comprising:
in response to the pre-validation list containing the second license plate number, initiating a validation timer for a maximum validation duration specified by the external entity; and
in response to absence of the second license plate number from an image captured by the exit camera and in response to absence of entry of an alternate payment method for the second license plate number prior to expiration of the validation timer:
 initiating payment from the external entity on behalf of the second vehicle for the maximum validation duration; and
 relabeling the second license plate number as unverified in the data log.

16. A method for managing parking within a parking structure comprising:
in response to detecting a license plate number in a first image, captured by an entry camera unit arranged near an entry of the parking structure at a first time, querying a whitelist for the first license plate number;
in response to the whitelist excluding the first license plate number:
 appending the data log for the parking structure with the first license plate number labeled as unverified; and
 in response to absence of submission of a new payment method, in association with the first license plate number, at a physical kiosk in the parking structure prior to a second time succeeding the first time by a grace period duration, relabeling the first license plate number as in-violation in the data log;
in response to detecting the first license plate number in a second image captured by a mobile enforcement unit moving through the parking structure and associated with an enforcement personnel:
 querying the data log for a status of the first license plate number; and
 in response to the first license plate number labeled as in-violation in the data log, serving a prompt to the enforcement personnel to issue a citation to a vehicle carrying the first license plate number; and in response to detecting the first license plate number in a third image captured by an exit camera unit arranged near an exit of the parking structure at a third time, labeling the first license plate number as exited in the data log.

17. The method of claim 16, further comprising:
in response to the whitelist containing the first license plate number:
    initiating payment for parking in the parking structure via a stored payment method associated with the first license plate; and
    labeling the first license plate number as validated in a data log associated with the parking structure; and
in response to the whitelist excluding the first license plate number, in response to submission of the new payment method, in association with the first license plate number, at the physical kiosk prior to the second time, relabeling the first license plate number as validated in the data log.

18. A method for managing parking within a parking structure comprising:
    deploying a mobile enforcement unit to the parking structure;
    accessing an image feed captured by a mobile camera arranged on the mobile enforcement unit while the mobile enforcement unit moves past vehicles occupying parking spaces in the parking structure;
    scanning images, in the image feed, for license plate numbers; and
    for each license plate number detected in the image feed:
        querying a data log associated with the parking structure for a status of the license plate number; and
        in response to the license plate number labeled as in-violation in the data log:
            outputting a first notification to an enforcement personnel occupying the mobile enforcement unit as the mobile enforcement unit moves past a vehicle carrying the license plate number, the first notification representing absence of parking validation for the license plate number within a grace period duration following entry of the vehicle into the parking structure; and
            queuing a printer to print a paper parking citation designating the license plate number.

19. The method of claim 18, further comprising, for each license plate number detected in the image feed:
    in response to the license plate number labeled as validated in the data log, outputting a second notification to the enforcement personnel as the mobile enforcement unit moves past a vehicle carrying the license plate number, the second notification different from the first notification and representing confirmation of parking validation for the license plate number; and
    in response to the license plate number labeled as un-validated in the data log, outputting a third notification to the enforcement personnel as the mobile enforcement unit moves past a vehicle carrying the license plate number, the third notification different from the first notification, representing absence of parking validation for the license plate number, and representing presence of the vehicle in the parking structure for less than the grace period duration.

20. The method of claim 18, further comprising:
in response to detecting a first license plate number in a first image captured by an entry camera unit arranged near an entry of the parking structure, querying a whitelist for the first license plate number;
in response to the whitelist containing the first license plate number:
    initiating payment for parking in the parking structure via a stored payment method associated with the first license plate; and
    labeling the first license plate number as validated in a data log associated with the parking structure;
in response to the whitelist excluding the first license plate number:
    appending the data log for the parking structure with the first license plate number labeled as unverified;
    initiating a timer, associated with the first license plate number, for a duration of a grace period;
    in response to submission of a new payment method, in association with the first license plate number, at a physical kiosk in the parking structure, relabeling the first license plate number as validated in the data log;
    in response to expiration of the timer prior to validation of the first license plate number, relabeling the first license plate number as in-violation in the data log.

* * * * *